United States Patent
Brown et al.

(10) Patent No.: US 7,543,739 B2
(45) Date of Patent: Jun. 9, 2009

(54) AUTOMATED PAYMENT CARD FRAUD DETECTION AND LOCATION

(75) Inventors: Kerry D. Brown, Portola Valley, CA (US); David Kevin Pariseau, Los Altos, CA (US); Daniel Chatelain, Emerald Hills, CA (US)

(73) Assignee: QSecure, Inc., Los Altos, CA (US)

(*) Notice: Subject to any disclaimer, the term of this patent is extended or adjusted under 35 U.S.C. 154(b) by 588 days.

(21) Appl. No.: 11/404,660

(22) Filed: Apr. 14, 2006

(65) Prior Publication Data

US 2006/0249574 A1 Nov. 9, 2006

Related U.S. Application Data

(63) Continuation-in-part of application No. 10/738,376, filed on Dec. 17, 2003, now Pat. No. 7,044,394, and a continuation-in-part of application No. 10/800,821, filed on Mar. 15, 2004.

(60) Provisional application No. 60/761,473, filed on Jan. 23, 2006.

(51) Int. Cl.
*G06K 5/00* (2006.01)

(52) U.S. Cl. .................. 235/380; 235/492; 235/451; 235/375

(58) Field of Classification Search .................. 235/380, 235/441, 451, 487, 492, 375
See application file for complete search history.

(56) References Cited

U.S. PATENT DOCUMENTS

| | | | |
|---|---|---|---|
| 5,180,902 A | 1/1993 | Schick | |
| 5,317,636 A | 5/1994 | Vizcaino | |
| 5,434,398 A | 7/1995 | Goldberg | |
| 5,623,552 A | 4/1997 | Lane | |
| 5,627,355 A | 5/1997 | Rahman | |
| 5,818,030 A | 10/1998 | Reyes | |
| 5,834,747 A | 11/1998 | Cooper | |
| 6,016,963 A * | 1/2000 | Ezawa et al. | 235/492 |
| 6,089,451 A | 7/2000 | Krause | |
| 6,206,293 B1 | 3/2001 | Gutman | |
| 6,308,890 B1 | 10/2001 | Cooper | |
| 6,345,766 B1 * | 2/2002 | Taskett et al. | 235/493 |
| 6,510,983 B2 | 1/2003 | Horowitz | |
| 6,592,044 B1 * | 7/2003 | Wong et al. | 235/493 |
| 6,636,833 B1 | 10/2003 | Flitcroft | |

(Continued)

*Primary Examiner*—Edwyn Labaze
(74) *Attorney, Agent, or Firm*—Richard B. Main

(57) ABSTRACT

A payment card fraud detection business model comprises an internal virtual account number generator and a user display for Card-Not-Present transactions. Card-Present transactions with merchant card readers are enabled by a magnetic array internally associated with the card's magnetic stripe. The internal virtual account number generator is able to reprogram some of the magnetic bits encoded in the magnetic stripe to reflect the latest virtual account number. The internal virtual account number generator produces a sequence of virtual numbers that can be predicted and approved by the issuing bank. Once a number is used, such is discarded and put on an exclusion list or reserved for a specific merchant until the expiration date. A server for the issuing bank logs the merchant locations associated with each use or attempted use, and provides real-time detection of fraudulent attempts to use a virtual account number on the exclusion list. Law enforcement efforts can then be directed in a timely and useful way not only where the fraud occurs but also at its origination.

11 Claims, 15 Drawing Sheets

U.S. PATENT DOCUMENTS

| | | |
|---|---|---|
| 6,764,005 B2 | 7/2004 | Cooper |
| 6,853,412 B2 | 2/2005 | Stephenson |
| 6,954,133 B2 | 10/2005 | McGregor |
| 2002/0096570 A1* | 7/2002 | Wong et al. .................. 235/494 |
| 2003/0080183 A1* | 5/2003 | Rajasekaran et al. ........ 235/379 |
| 2004/0123132 A1 | 6/2004 | Montgomery |
| 2004/0133787 A1 | 7/2004 | Doughty |
| 2005/0001711 A1 | 1/2005 | Doughty |
| 2005/0043997 A1 | 2/2005 | Sahota |
| 2005/0086177 A1* | 4/2005 | Anderson et al. ............. 705/64 |
| 2006/0032906 A1* | 2/2006 | Sines .......................... 235/380 |

* cited by examiner

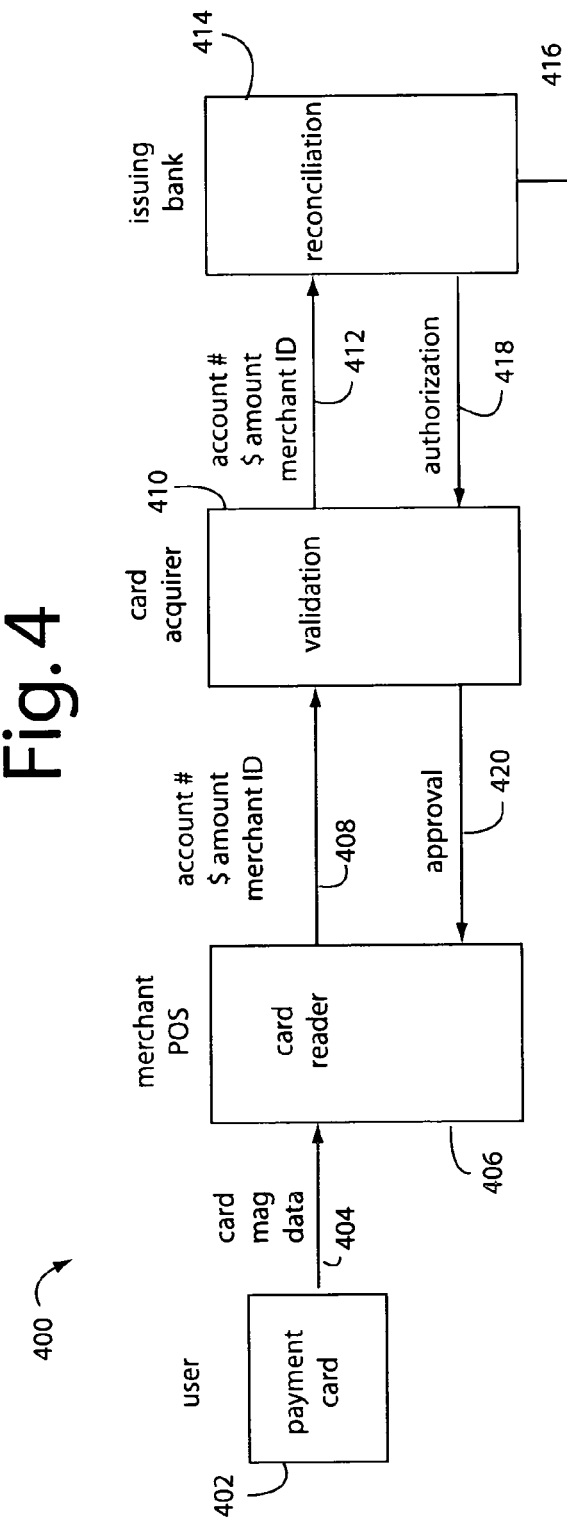
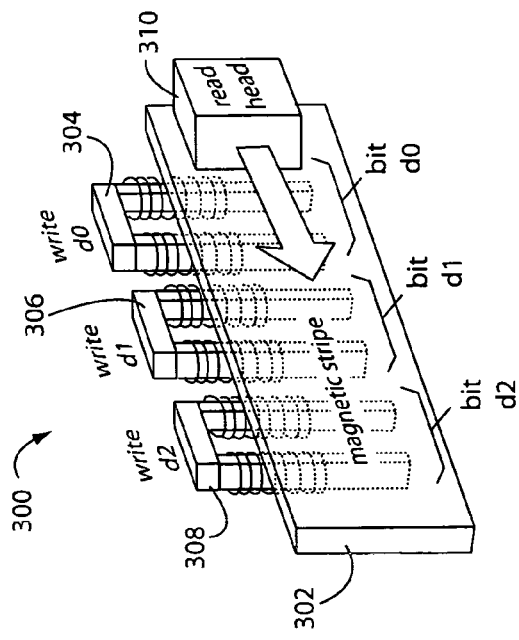

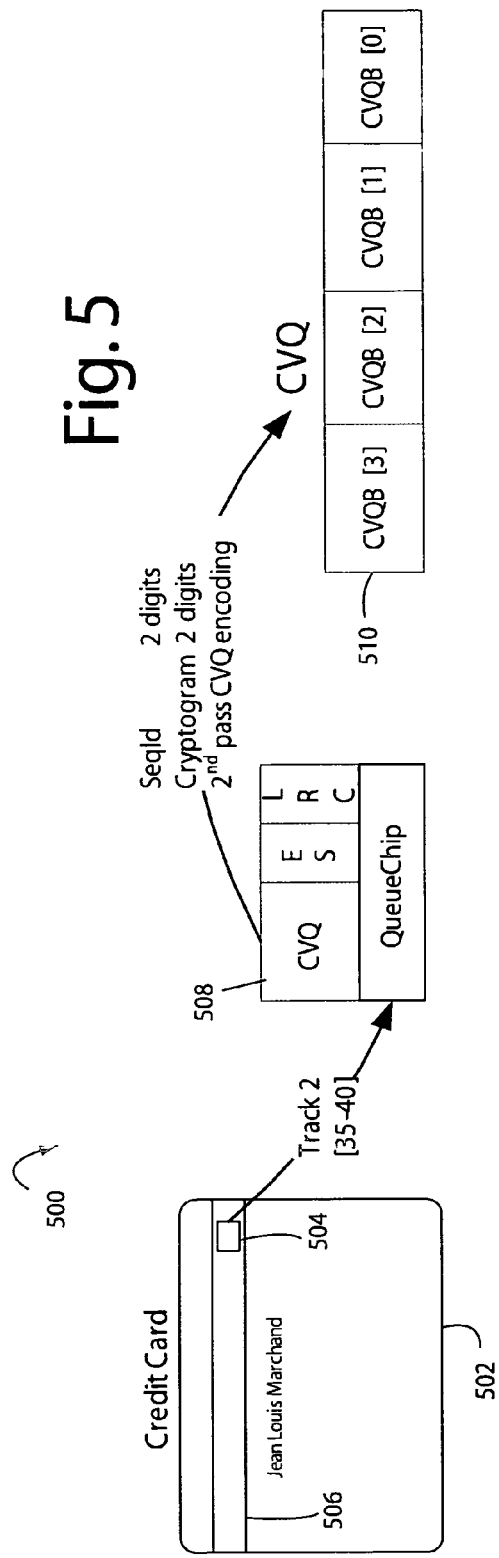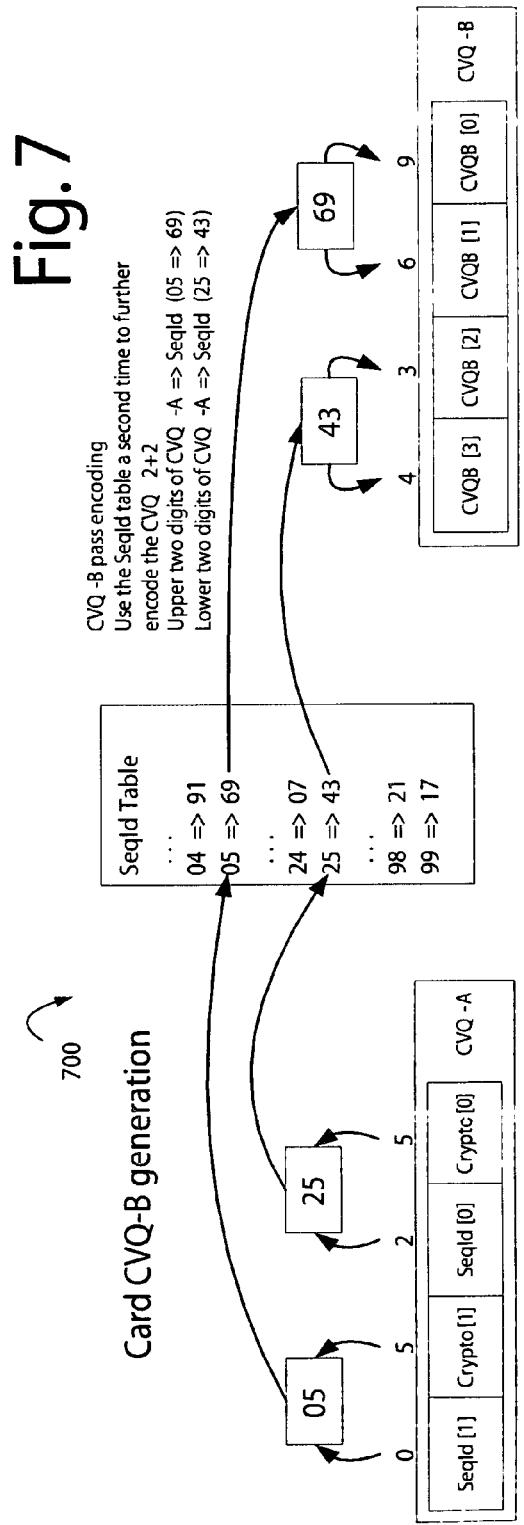

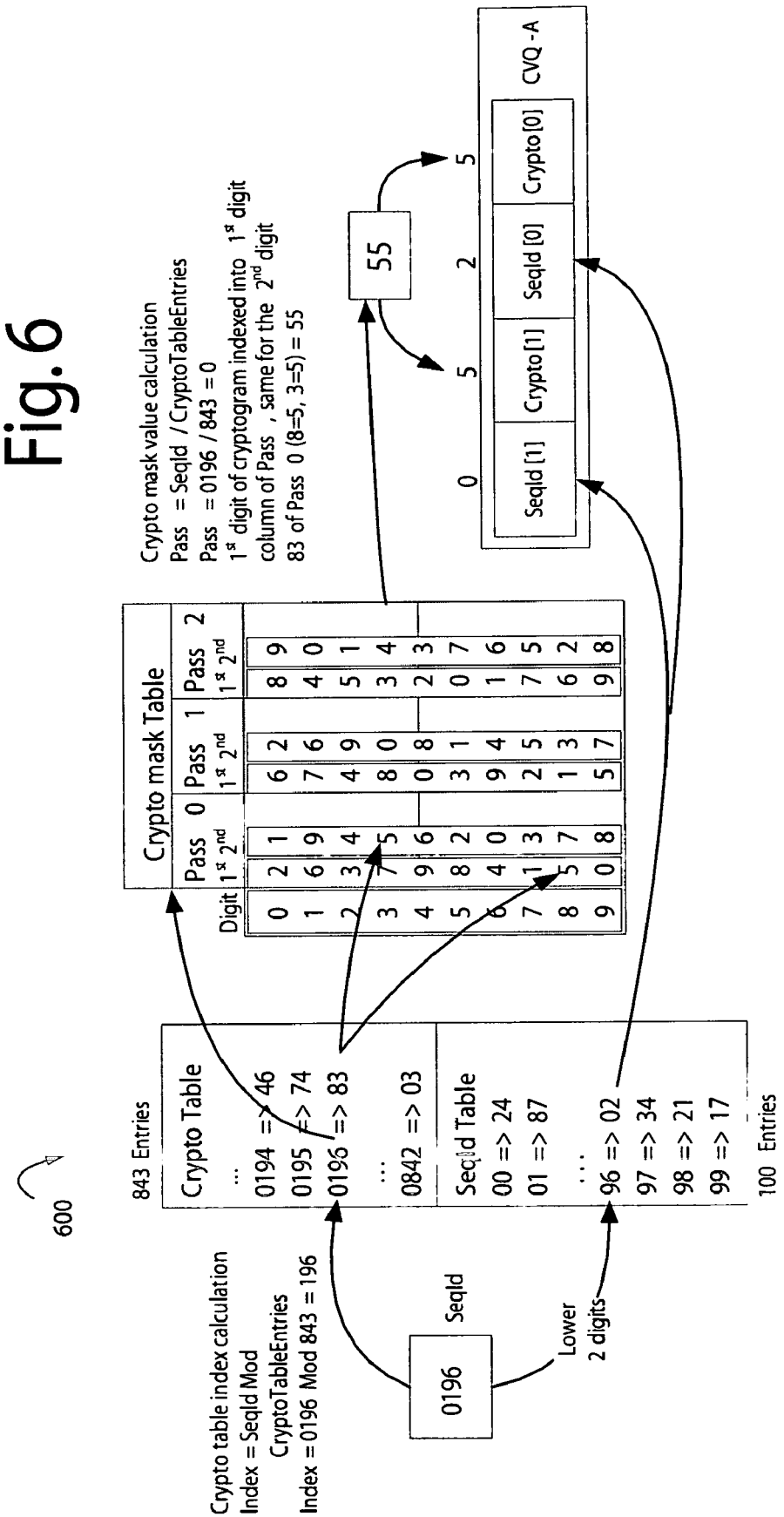

Fig. 20
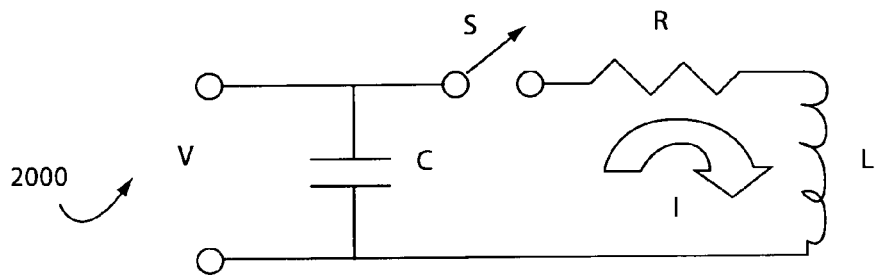
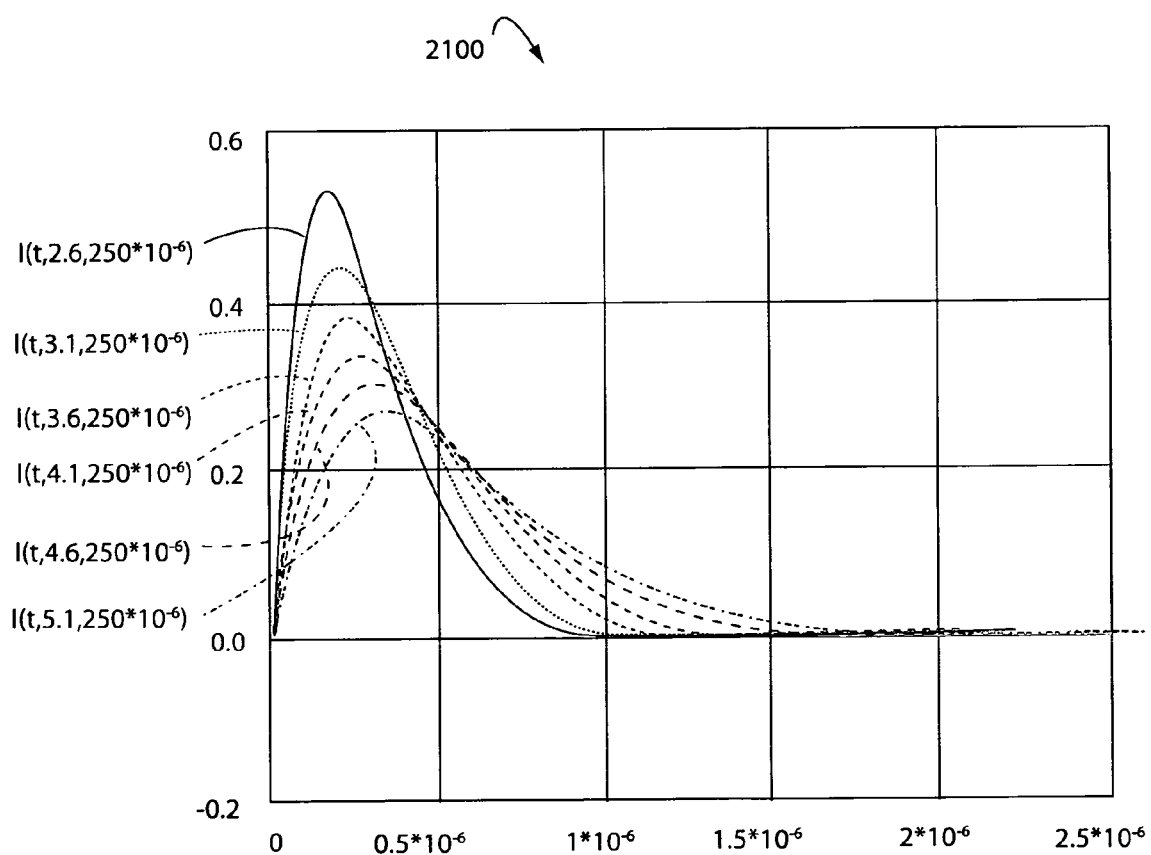
Fig. 21

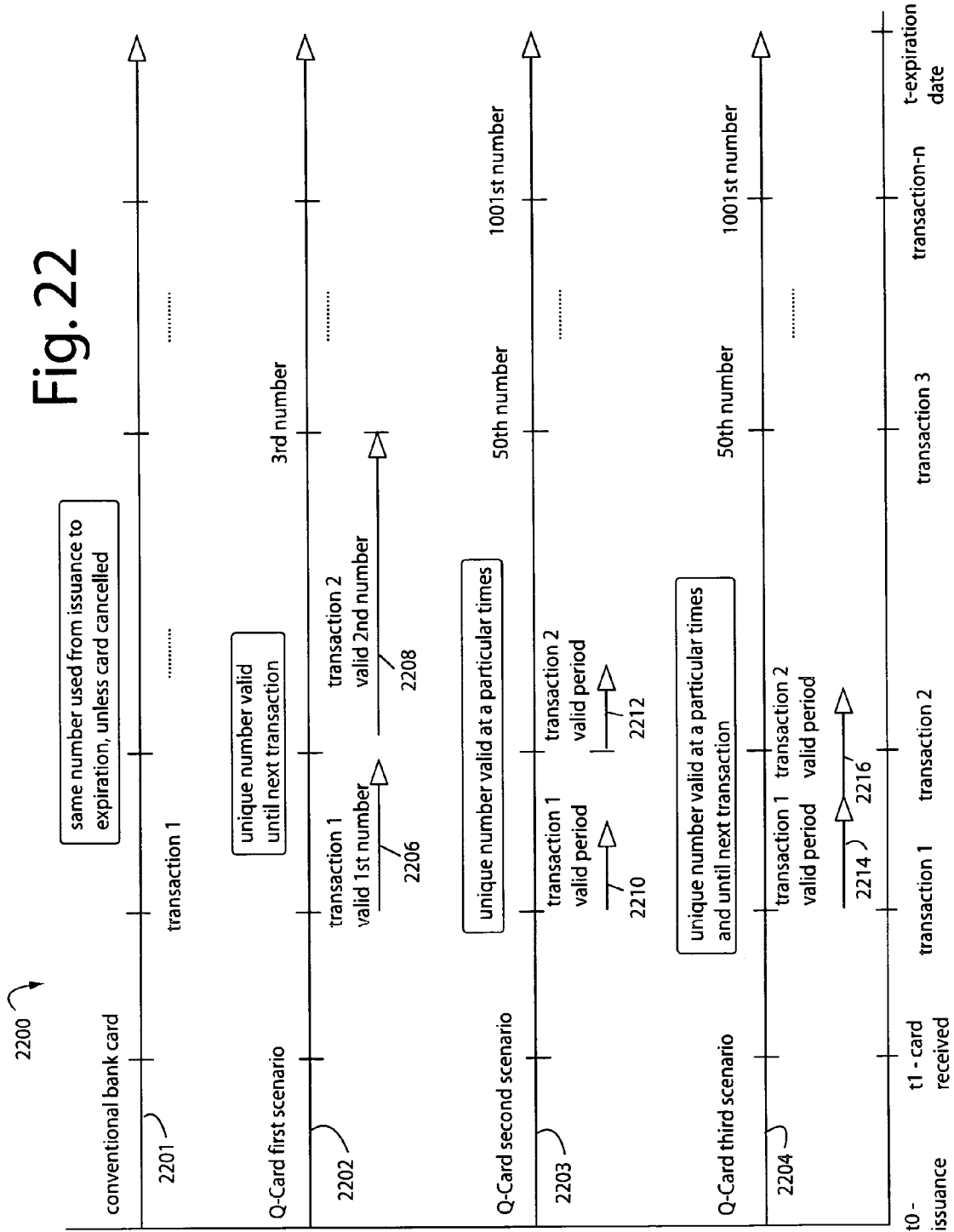

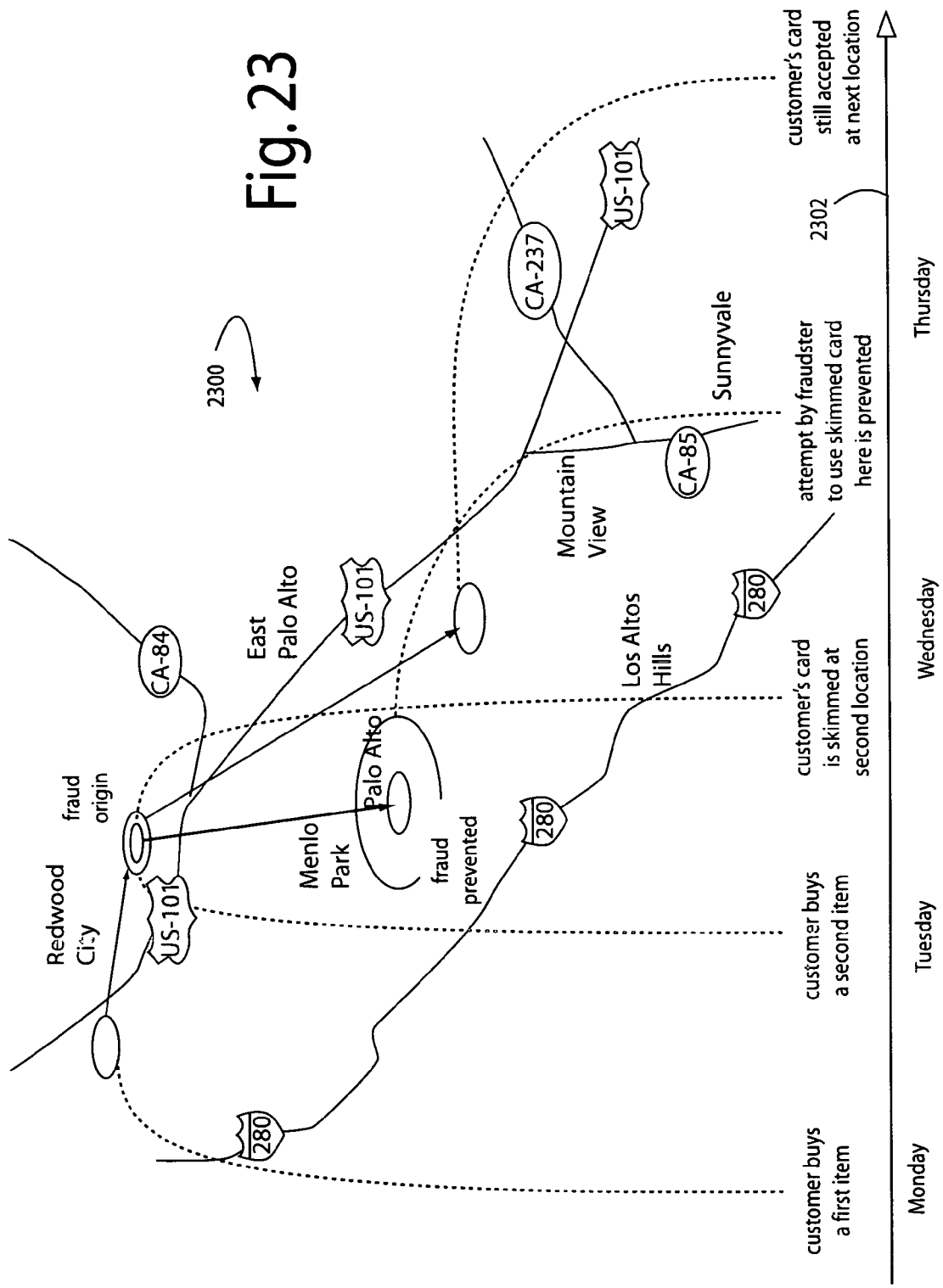

AUTOMATED PAYMENT CARD FRAUD DETECTION AND LOCATION

RELATED APPLICATIONS

This Application claims benefit of U.S. Provisional Patent Application Ser. No. 60/761,473, filed Jan. 23, 2006 by the present inventor, Kerry BROWN, and titled REAL-TIME PAYMENT CARD FRAUD DETECTION AND LOCATION.

This Application is a continuation-in-part of U.S. patent application Ser. No. 10/738,376, filed Dec. 17, 2003 now U.S. Pat. No. 7,044,394, by the present inventor, Kerry Dennis BROWN, and titled PROGRAMMABLE MAGNETIC DATA STORAGE CARD; and also, U.S. patent application Ser. No. 10/800,821, filed Mar. 15, 2004, by the present inventor, Kerry Dennis BROWN, and titled THREE-LEGACY MODE PAYMENT CARD WITH PARAMETRIC AUTHENTICATION AND DATA INPUT ELEMENTS.

BACKGROUND OF THE INVENTION

1. Field of the Invention

The present invention relates to payment card fraud, and more particularly to automated payment card fraud detection and location.

2. Description of Related Art

Credit card and debit card use have become ubiquitous throughout the world. Originally, credit cards simply carried embossed numbers that were pressed against a carbon copy bank draft in a mechanical card-swiping machine. Merchants simply accepted any card presented, but then fraud became widespread. The used carbons could even be gathered from trashcans to glean account numbers for unauthorized transactions.

Imposing spending limits and issuing printed lists of lost/stolen cards proved ineffective in preventing fraud and other financial losses. So, merchants were subsequently required to telephone a transaction authorization center to get pre-approval for transactions.

These pre-approvals were initially required only for purchases above a certain limit, but, as time went on, these transaction limits decreased such that more and more transactions required authorization. The volume of telephone traffic increased, the costs associated with each transaction escalated, and customers grew impatient, waiting for authorization calls to complete.

To speed up the authorization process and create an additional barrier for fraudsters, magnetic stripes were added to the embossed numbers and signature panel on credit cards.

Automated authorization systems appeared almost everywhere that allowed faster and easier transactions by reading and verifying the magnetic stripes on the backs of the cards and then handling the authorization process (for those transactions requiring verification) through a communications link. The card readers and computers improved the speed and accuracy of transaction processing and decreased the number of costly human errors. They also allowed near real-time control of fraudulent card usage. But detecting and reacting appropriately to fraud remained a problem.

Several of the elements which are embossed and magnetically recorded on MasterCard, Visa, and other typical payment cards are there to uniquely identify the account cardholder. A standardized personal account number (PAN) comprises four fields, e.g., a system number, a bank/product number, a user account number, and a check digit. This PAN is typically sixteen digits but may be up to nineteen digits. The first six digits are called a BIN and represent the card network, the bank and the product for this bank. The last digit is reserved for the checksum of the previous digits of the PAN. Such fields are not all these sizes for all issuers An expiration date is associated with the PAN and comprises a month and year code, e.g., four more digits, but with limited range. The cardholder's name or business usually appears on the face of the card in the embossing and is magnetically recorded on the back.

To reduce the level of fraud, several security features have been added to payment cards. The PIN code is primarily used for debit card-present transactions. Since this PIN must not hidden from everyone but the cardholder, such must be entered on secure and certified machines to make sure that no one can gain access to such. Also, the PIN is stored on the magnetic stripe of the card in an encrypted form within a cryptogram block.

Since such was relatively easy for a fraudster to copy the PAN and expiration date of a card and create a copy of that card, the banks introduced a Card Verification Value (CVV) or Card Verification Code (CVC) on the magnetic stripe to make such more difficult for fraudsters to replicate a card. This code is usually a unique cryptogram, created based on the card data and the bank's master key. As a consequence, a fraudster had to gain possession of the card long enough to make a copy of the magnetic stripe in order to duplicate the card.

The same principle was adopted later for a second CVC sometimes called CVV2, which is commonly printed in the signature panel on the back of the card. This CVV2 is used primarily to help secure eCommerce and Mail Order/Telephone Order (MOTO) transactions. This is a second unique cryptogram created from card data and the bank's master key (though different than the magnetic stripe CVC). The CVV2 is not present on the magnetic stripe.

There are two major types of transactions, "Card-Not-Present" with the Internet or MOTO, and "Card-Present" with point-of-sale (POS) or Automatic Teller Machines (ATM). Card-Present transactions involve magnetic card readers and always use the full 16-digit PAN (17 digits w/AMEX) and the 4-digit expiration date. Card-Not-Present transactions require the user to read the embossed PAN and expiration date digits, and sometimes also the CVC/CVV2 number.

A principal way to stop fraudulent use of a stolen or compromised account number has been to simply cancel the old account number and issue a new one with a new expiration date. So, the issuing banks put in place a mechanism to invalidate old account numbers and to issue new numbers to existing users. But getting the new card could sometimes take weeks, and the delay would greatly inconvenience the user and cause a lull in spending.

With the emergence of eCommerce, more and more transactions are becoming Card-Not-Present transactions. This type of transaction is subject to an increasing number of attacks from fraudsters. Several solutions to address this growing fraud have been developed and deployed. Such include use of Virtual Account numbers, authentication of cardholders separate from transaction, and use of hardware token to authenticate the user.

For example, American Express introduced a service called "Private Payments," Orbiscom (Ireland) has "Controlled Payment Numbers," and Discover Desktop and Citibank (New York) have similar products referred to as a "Virtual Account Numbers". All of these solutions allow cardholders to shop online without having to transmit their actual card details over the Internet. Instead, these systems generate substitute single-use credit card numbers for secure online purchasing. The virtual number generator is either downloaded to the user's computer or accessed online. The user returns to the website for another new virtual number for subsequent transactions. Neither the merchant nor a card-number skimmer can use the number after its first use. So, seeing or having the virtual account number will do them no good if the user has already completed the intended transaction. The user is thus protected from fraudulent transactions because the virtual number is moved to an exclusion list. This also prevents an authorized merchant from automatically initiating future charges that a user may not have really agreed to nor been aware of.

A limitation with using Virtual Account Numbers is such requires the use of the Internet or at least a personal computer to get each new number, and the transactions must be online. POS or ATM use with magnetic card readers still obtain the real account number and continue to be subject to fraud.

Another example is Visa that has developed and is providing Verified by Visa to its member banks. This service once adopted by a bank is used by its customers at merchants' sites equipped to handle this type of transaction at checkout. The concept is when a customer wants to pay, he/she receives directly from the issuing bank a request on the screen to authenticate him/herself with a login and password. This way, the issuer knows that the right person is making the purchase.

SUMMARY OF THE INVENTION

Briefly, a payment card embodiment of the present invention comprises an internal virtual account number generator and a user display for Card-Not-Present transactions. Card-Present transactions with merchant card readers are enabled by a magnetic array internally associated with the card's magnetic stripe. The internal virtual account number generator is able to reprogram some of the magnetic bits encoded in the magnetic stripe to reflect the latest virtual account number. The internal virtual account number generator produces a sequence of virtual numbers that can be predicted and approved by the issuing bank. A server for the issuing bank logs the merchant locations associated with each use or attempted use, and provides real-time detection of fraudulent attempts to use a virtual account number. Law enforcement efforts can then be directed in a timely and useful way.

An advantage of the present invention is a payment card is provided for use with existing legacy payment card systems.

A further advantage of the present invention is a payment card is provided that can help protect the user, the merchant and the issuing bank from fraud.

A still further advantage of the present invention is that a payment card is provided that does not require hardware or software changes to merchant point-of-sale terminals or Automatic Teller machines.

Another advantage of the present invention is that one card can express the personalities of several different kinds of payment cards issued by independent payment processors.

Another advantage of the present invention is a payment card that can generate a new account number upon each usage, and by doing so, authenticate itself to the transaction infrastructure.

Another advantage of the present invention is that the system can identify when and where a transaction takes place. For example, if a card is skimmed by a waiter in a restaurant, the issuing bank will have sufficient data to determine when such happened by the transaction date and where such happened by the merchant ID.

Another advantage of the present invention is that a payment card is provided that is not as easy to duplicate and use.

Re-encoding of the magstripe with a stolen number by a fraudster will not work anymore as such did before (since the magnetic stripe information changes with each transaction).

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 3 is a perspective diagram of a magnetic array embodiment of the present invention with MIG heads, other preferred embodiments use a single core solenoidal structure;

FIG. 4 is a functional block diagram of a payment system embodiment that can be used with the payment card of FIGS. 1-2;

FIG. 5 is a flowchart diagram of a CVQ Revised Cryptographic scheme embodiment of the present invention;

FIG. 6 is a flowchart diagram of a Card CVQ generation method embodiment of the present invention;

FIG. 7 is a flowchart diagram of a Card CVQ-B generation method embodiment of the present invention;

FIG. 20 is a RLC circuit with a programming switch that represents the equivalent circuit for an exemplary magnetic MEMS device coil. Such isolates the high pulse currents (I) needed by the coils from the relatively delicate card battery. The on-card battery (V) slowly charges a capacitor (C) within its capabilities. When the programming switch (S) is closed to write a magnetic bit, the capacitor provides a low-impedance source of current to the coil inductance (L) through the circuit resistance (R);

FIG. 21 is a graph showing the effects of changing the R and L constants in the circuit of FIG. 15. A current peak, for example, of 0.5 amps is delivered in 200 nanoseconds from a 0.1 microfarad capacitor (C) when R is 2.6 ohms, and the coil is 250 nanohenries;

FIG. 22 is a set of timelines for a conventional credit card and three scenarios for different moded Q-Card embodiments of the present inventions, and shows when and how the account numbers are presented. The transaction numbers remain constant after initial use for some time period before a new number is generated; and FIG. 23 is a map and timeline representing how an attempt at skimming a Q-Card is detected and fraudulent use is prevented and reported to law enforcement.

DESCRIPTION OF THE INVENTION

Figure 1:
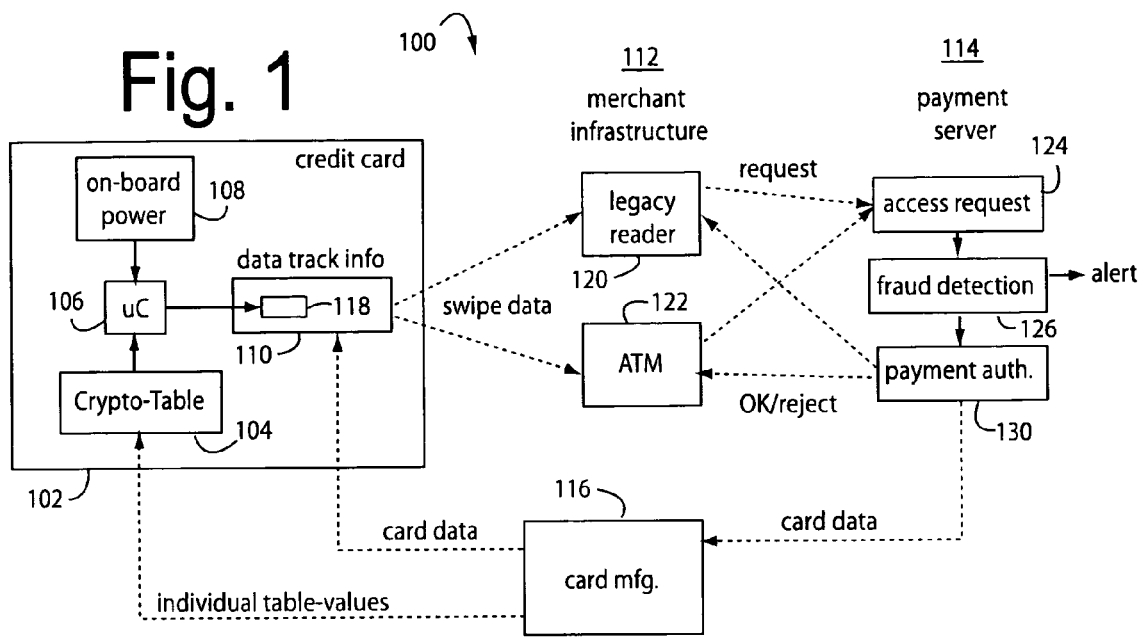
FIG. 1 is a functional block diagram of a payment card system embodiment of the present invention.

FIG. 1 illustrates a payment card system embodiment of the present invention, and is referred to herein by the general reference numeral 100. System 100 greatly reduces the risks of fraud by credit card skimming, and yet remains compatible with the vast installed base of magnetic payment card readers in the world.

Various configurations share a common core set of technologies. Every basic embodiment invariably depends on a "Q-Card" in a credit card format 102, a crypto-table 104, a microcontroller 106 to access the crypto-table, an on-board power source 108 for the microcontroller, a data track 110 that is partially affected by the microcontroller according to crypto-table values, means 112 to communicate the data track information to a payment server 114, and host server 114 to authenticate the data track information.

The credit card format is dictated by industry standards for bank credit cards and all else must fit inside these constraints.

The crypto-table 104 stores a set of values that have been cryptographically computed during card manufacture 116 and preloaded into a table for secure access by the on-board microcontroller or can be generated in real time in the card. These are such that a next valid value cannot be predicted from the exposure of a presently valid value being used in a current transaction.

The microcontroller (uC) 106 is awakened whenever the card is to be used, and fetches a next crypto-table value when needed. Such inserts a result into a programmable part 118 of the data track 110 that becomes the whole access number. Such does not execute an encryption process because the numbers stored in the table during manufacturing were already encrypted using a seed connected with the user, or chosen at random and then ordered, such that a next valid number cannot be predicted from any that were used before. The payment server 114 allows some mis-synchronization for what should be the next valid number, within a range of next valid numbers such already knows are associated with the particular card.

The means to communicate information read from the data track 110 to a host server 114 preferably relies on presently deployed legacy card readers 120 and ATM's 122 to forward a swipe data to host server 114 for authentication and payment. Each request is scanned by an access request program 124. If acceptable so far, the payment request is forwarded to a fraud detection program 126. Acceptable crypto-table values that were created during card manufacturing 116 are computed in the fraud detection program 126 in real-time use as they are presented so they do not need to be stored by the payment server 114. An alert can issue if the value was presented before and used without incident. If no fraud is detected, and payment authority is verified, a payment authorization program 130 sends an authorization code to the legacy card reader 120 or ATM 122.

An add-on program for the host server 114 is provided its own list of crypto-table values that were loaded into each card during manufacture, and such checks these against what such receives in payment requests. The server limits each value to one use, and the location and time of each use are logged.

A timer can be included in the card in alternative embodiments of the present invention. Such timer is activated after a card transaction. If the timer times-out, a next transaction number is skipped and a new count is reset. This prevents copies of magstripe data from being accepted in a decision making process to authorize the transactions after a fixed period of time.

Figure 2:
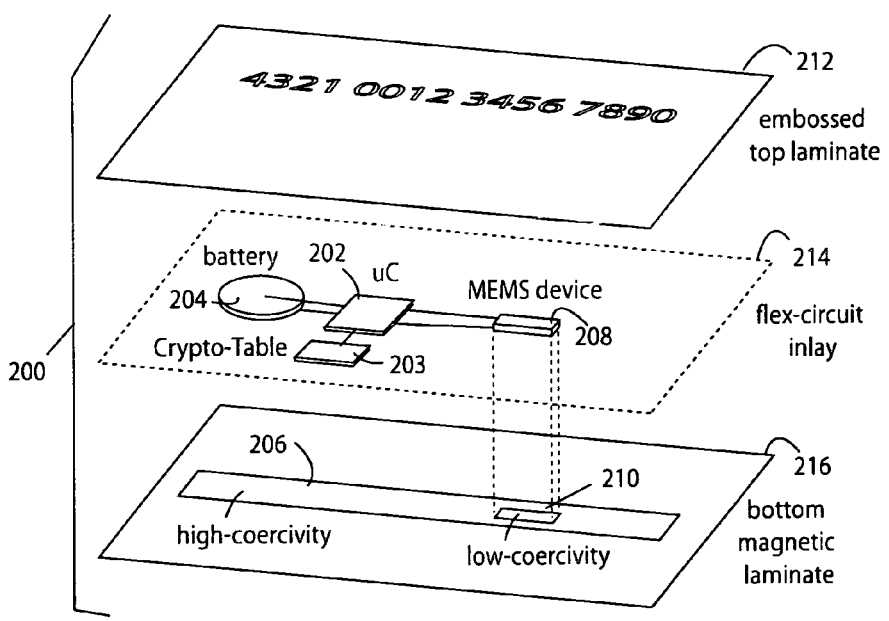
FIG. 2 is a perspective diagram of a payment card embodiment of the present invention.

As shown in FIG. 2, a credit card 200 has a flexible circuit sandwiched between two outer plastic laminates. It appears to be an ordinary credit card, and is not used by the consumer any differently. A microcontroller (uC) 202 and crypto-table memory 203 are powered by a battery 204, photovoltaic cell, and/or piezoelectric strain generator. Sensors, not shown, may be included to control when the microcontroller should be activated, in order to conserve power drain. In alternative embodiments, the embossed account numbers are replaced by a display which is activated by a finger press on an included "Q-button". One method to prevent accidental button presses includes slotting the Q-button to fit a typical finger and requiring a minimum time before activation.

The data track 206 has the account access information to be presented during a transaction. Such can be a magnetically encoded set of tracks on a magnetic stripe, a wireless transmission as in a smartcard, and/or a visual readout in an on-board user display. A magnetic MEMS device 208 sits under a low-coercivity window 210 and both implement the programmable part 118 in FIG. 1.

Payment card 200 resembles a typical credit or ATM card, but may be a little thicker to accommodate the electronics sandwiched inside. The payment card industry has published standards for all aspects of payment cards, and these regulate the card size, thickness, tolerance to flexing, positioning of account numbers and user information, magnetic recording formats on the magnetic stripe on the back, etc. Payment card 200 is compatible with these industry standards so as to allow rapid assimilation into the payment card system and its use by consumers.

Payment card 200 comprises three layers 212, 214, 216, which are fused together. Other construction methods can be used, e.g., a solid cast material in which the electronics are embedded. The front layer 212 may include a digital user display for displaying a virtual account number. Some of the digits can be fixed and simply embossed and not electronically displayed. An alternative digital user display is used to display an expiration date. The middle layer 214 includes electronics for a virtual account number generator, a display controller, and a magnetic strip controller. The back layer 216 has a partially programmable magnetic stripe 206 and a printed card verification value (CVV).

The programmable magnetic stripe can be like that described in U.S. patent application Ser. No. 10/738,376, filed Dec. 17, 2003, and titled PROGRAMMABLE MAGNETIC DATA STORAGE CARD; and also, U.S. patent application Ser. No. 10/800,821, filed Mar. 15, 2004, and titled THREE-LEGACY MODE PAYMENT CARD WITH PARAMETRIC AUTHENTICATION AND DATA INPUT ELEMENTS. Both are incorporated herein by reference.

The programmable magnetic stripe will typically have three lines of data programming written on such by a magnetic card writer, e.g., by a card issuer. Parts of the magnetic stripe are subject to being reprogrammed from within the payment card itself. Such is advantageous if these parts comprise low-coercitivity magnetic materials chosen so that any magnetic recordings pressed upon them will dissipate and fade away after a predetermined time, e.g., a few minutes. This helps make sure any new account numbers internally generated and written to the magnetic stripe will only be used once and only in a valid transaction. After the recordings have faded away, the card can be used again, but only after a new account number is generated internally. The new account numbers will be unique to each transaction and merchant, so fraud detection is made possible at the issuing banks' payment processing servers.

The implementation of payment card 200 is challenging in that all the electronics need to be very thin and low power. The digital displays must be flexible, and any embedded battery needs to be able to operate the electronics for at least one year of typical use. Conventional, albeit advanced technologies are presently available to fabricate payment card 200 as described. Therefore, a detailed description of those fabrication methods is not necessary here.

Some of the digits of the virtual account number in any display may be fixed. Such fixed numbers can be embossed or printed and not electronically represented. Similarly, some of the data related to the virtual account number and encoded to magnetic stripe may also be fixed. The fixed bits can be recorded externally by a card writer, while the rest are electronically programmable from within. The fixed bits can represent the card type, and the bank number, e.g., the first 4-5 numbers of the personal account number. There can be some security benefits realized by not writing or displaying the virtual account numbers until there are actually going to be used.

In the past, the magnetic recordings laid down in the three tracks had some latitude in their exact placement on the magnetic stripe. However, payment card 200 will require that these recordings be properly aligned with the data being represented by the magnetic MEMS device 208 that sits inside under the low-coercitivity window 210. The mesh of the two magnetic data must be accurate to within one recorded bit, or else guard bit positions must be provided to accommodate slight misalignments. A specialized card writer is also required for this purpose that can read and store the original recordings, sense the location of the magnetic MEMS device 208, and write the recordings back in their properly aligned positions.

There are two modes of use for payment card 200, e.g., Card-Not-Present and Card-Present. More specially, Card-Not-Present is used for online Internet use where no card reader can be present, e.g., "card not present" transactions or mail-order/telephone-order by fax, mail, phone, email, instant messaging, etc. The user must manually read off to the merchant the virtual account number and the expiration date, e.g., over the telephone or entered into an order form on a website.

A new valid use-once account number may appear in user display, e.g., in response to some stimulus, like the pressing of a membrane switch button or sequence. Card-Present relates to point-of-sale (POS) use where a merchant card reader is present. The virtual account number and expiration date are machine-read by a magnetic card reader. A new valid use-once account number will appear in magnetic stripe 118, e.g., again in response to some stimulus like sensing the swiping of the card in the reader. The sending of the virtual account number to the user display and magnetic stripe 118 can be independent, or they can be coordinated in the case of a Card-Present POS transaction where the merchant is required to read off the last four account numbers and key them manually into the card reader.

A magnetic array is arranged on the back of the card 102 behind magnetic stripe 118. This presents what appears to be an ordinary magnetic stripe encoded with appropriate bank and user information for a conventional magnetic card reader. Such readers are ubiquitous throughout the world at point-of-sale terminals, and such is very important not to require any changes to these readers in order to accommodate the proper use of payment card 200.

An embedded power source is needed by payment card 200 that can last for the needed service life of a typical smartcard, e.g., about eighteen months to four years. A battery or a piezoelectric generator and charger can be used. Such piezoelectric generator converts incidental temperature excursions and mechanical flexing of the card into electrical power that can charge a storage capacitor or help maintain the battery. A piezoelectric crystal is arranged to receive mechanical energy from card flexing and/or keypad use. The charger converts the alternating current (AC) received into direct current (DC) and steps such up to a voltage that will charge the battery. Alternative embodiments can include embedded photovoltaic cells to power the card or charge its battery.

A conventional, "legacy", merchant point-of-sale magnetic-stripe card reader 120 is used to read user account data recorded on a magnetic stripe 206 on the payment card 200. Such is used by a merchant in a traditional way, the payment card 200 appears and functions like an ordinary debit, credit, loyalty, prepay, and similar cards with a magnetic stripe on the back.

User account data is recorded on the magnetic stripe 206 using industry-standard formats and encoding. For example, ISO/IEC-7810, ISO/IEC-7811(-1:6), and ISO/IEC-7813, available from American National Standards Institute (NYC, N.Y.). These standards specify the physical characteristics of the cards, embossing, low-coercitivity magnetic stripe media characteristics, location of embossed characters, location of data tracks 2-3, high-coercitivity magnetic stripe media characteristics, and financial transaction cards. A typical Track-1, as defined by the International Air Transport Association (IATA), is seventy-nine alphanumeric characters recorded at 210-bits-per-inch (bpi) with 7-bit encoding. A typical Track-2, as defined by the American Bankers Association (ABA), is forty numeric characters at 75-bpi with 5-bit encoding, and Track-3 (ISO/IEC-4909) is typically one hundred and seven numeric characters at 210-bpi with 5-bit encoding. Each track has starting and ending sentinels, and a longitudinal redundancy check character (LRC). The Track-1 format includes user primary account information, user name, expiration date, service code, and discretionary data. These tracks conform to the ISO/IEC/IEC Standards 7810, 7811-1-6, and 7813, or other suitable formats.

The magnetic stripe 206 is located on the back surface of payment card 200. A data generator, e.g., implemented with microprocessor 202 and crypto-table 203, receives its initial programming and personalization data from a data receptor. For example, such data receptor can be implemented as a serial inductor placed under the magnetic stripe which is excited by a standard magnetic card writer. Additionally, the data may be installed at the card issuer, bank agency, or manufacturer by existing legacy methods. The data received is stored in non-volatile memory. Alternatively, a data receptor can be a radio frequency antenna and receiver, typical to ISO/IEC/IEC Specifications 24443 and 25693. The data generator may be part of a secure processor that can do cryptographic processing, similar to Europay-Mastercard-Visa (EMV) cryptoprocessors used in prior art "smart cards".

Card-swipes generate detection sensing signals from one or a pair of detectors. These are embedded at one or each end of magnetic stripe 206 and can sense the pressure and/or ohmic contact applied by a magnetic read head in a scanner.

Embodiments of the present invention combine parallel fixed-position write heads on one side of a thin, planar magnetic media, and a moving serial read head on the opposite side. Such operation resembles a parallel-in, serial-out shift register.

The legacy card reader 120 is a conventional commercial unit as are already typically deployed throughout the world, but especially in the United States. Such deployment in the United States is so deep and widespread, that conversion to contact and contactless smartcard systems has been inhibited by merchant reluctance for more purchases, employee training, counter space, and other concerns.

Such is an important aspect of the present invention that the outward use of the payment card 200 not require any modification of the behavior of the user, nor require any special types of card readers. Such is a distinguishing characteristic and a principle reason that embodiments of the present invention would be commercially successful. The card reader 120 has a magnetic-transducer read head that is manually translated along the length of data stripe.

The magnetic-transducer MEMS device 208 must be very thin and small, as they must fit within the relatively thin body of a plastic payment card, and be packed dense enough to conform to the standard recording bit densities. Integrated combinations of micro-electro-mechanical systems (MEMS) nanotechnology, and longitudinal and perpendicular ferromagnetics are therefore useful in implementations that use standard semiconductor and magnetic recording thin-film technologies.

A payment card fraud business model embodiment of the present invention issues users a payment card able to internally generate a new account number on a magnetic stripe each time such is used. The merchant card reader 120 is connected to read the magnetic stripe 206 on the payment card 200, and to report the new account number when a user initiates a merchant transaction. A report from the merchant card reader is analyzed by a issuing bank payment processing server 114 to determine if the new account number is valid or an attempt at fraud. Merchant identification data associated with each the report from the merchant card reader is logged into a database. A decision is made whether to authorize the merchant transaction based on a validity criteria associated with the new account number. The database is inspected for evidence of fraudulent payment card use. Reports can be made for law enforcement efforts in real-time to identify the payment cards and locations of the merchant card readers connected with suspected fraudulent activity. Alternatively, the database can be mined for evidence of fraudulent payment card use, and the payment card 200 can be disabled from being able to initiate any further merchant transactions.

Business model embodiments of the present invention are such that the issuers provide to users a payment card in which the magnetic stripe has material with a low coercitivity selected so that any magnetic data recordings internally generated will automatically fade away after a few minutes to obfuscate the new account number. Or, the issuing to users of a payment card is such that the magnetic stripe has material with a coercitivity characteristic selected so that any magnetic data recordings internally generated will automatically fade away after a few minutes in order to prevent the new account number being read by a magnetic card reader.

A swipe sensor may be located adjacent to the magnetic stripe to trigger an internal writing of a magnetic data recording that will automatically fade away after a few minutes in order to prevent the new account number being read by a magnetic card reader after a predetermined expiration time. Such can be a resistivity sensor that measures the ohmic contact of a metal read head during card swiping. Such might product few false swipe detections that a pressure sensitive type, especially in situations where the card is placed in a wallet or purse and can be sat on, flexed, or otherwise jostled.

Embodiments of the present invention include a payment card able to internally generate a new account number on a magnetic stripe each time such is used in a merchant magnetic card reader or any payment acceptance device. A payment processing server is used for analyzing a report from the merchant card reader to determine if the new account number is valid or an attempt at fraud. A database of merchant identification data associates each report from the merchant card reader. A program included in the server decides whether to authorize the merchant transaction based on a validity criteria associated with the new account number. Any legacy merchant card reader can be used to read the magnetic stripe on the payment card, and to report the new account number when a user initiates a merchant transaction. A device for mining the database for evidence of fraudulent payment card use could be implemented with software. A report data enables real-time law enforcement efforts identify the payment card and locations of the merchant card reader. System embodiments further include means for mining the database for evidence of fraudulent payment card use, and means for disabling the payment card from being able to initiate any further merchant transactions.

Preferably, payment card embodiments of the present invention are such that the magnetic stripe has material with a low coercitivity selected so that any magnetic data recordings internally generated will automatically fade away after a few minutes to obfuscate the new account number.

FIG. 3 illustrates a magnetic data storage array embodiment of the present invention, and is referred to by the general reference numeral 300. The magnetic data storage array 300 includes a magnetic stripe 302 that mimics those commonly found on the backs of credit cards, debit cards, access cards, and drivers licenses or other authentication methods magstripe based. In alternative embodiments of the present invention, array 300 can be a two-dimensional array, and not just a single track.

Here in FIG. 3, magnetic data bits d0-d2 are arranged in a single track. A set of fixed-position write heads 304, 306, and 308 respectively write and rewrite magnetic data bits d0-d2. A moving or fixed, scanning read head 310 in a legacy magnetic card reader is used to read out the data written.

Parts of magnetic data storage array 300 can be implemented with MEMS technology. In general, MEMS is the integration of mechanical elements, sensors, actuators, and electronics on a common substrate using microfabrication technology. Electronics devices are typically fabricated with CMOS, bipolar, or BICMOS integrated circuit processes. Micromechanical components can be fabricated using compatible "micromachining" processes that selectively etch away parts of a processing wafer, or add new structural layers to form mechanical and electro-mechanical devices.

In the present case, MEMS technology can be used to fabricate coils that wind around Permalloy magnetic cores with gaps to produce very tiny magnetic transducer write heads. For example, a magnetic transducer write head that would be useful in the payment card 200 of FIG. 1 would have a gap length of 1-50 microns, a core length of 100-250 microns, a write track width of 1000-2500 microns, and a read track width of 1000 microns. Nickel-iron core media permeability would be greater than 2000, and cobalt-platinum or gamma ferric oxide media permeability would be greater than 2.0, and the media coercivity would be a minimum of 300 Oe.

A parallel array static MEMS (S-MEMS) device is a magnetic transducer which will allow information to be written in-situ on the data tracks of a standard form factor magnetic stripe card. In a practical application, an array of twenty-five individual magnetic bit cells can be located at one end of an ISO/IEC/IEC 7811 standard magnetic media. Such a stripe includes some permanent encoding, as well as a region in which data patterns can be written by arrays of magnetic heads attached to a low-coercivity magnetic stripe.

Each cell of such parallel array is independently electronically addressed. Write transducer current may flow in one direction or the other, depending on the desired polarity of the magnetic data bits. The magnetic stripe transaction reader operates by detection of magnetic domain transitions within an F2F scheme typical of such cards and, therefore, magnetic domain reversal is not necessary. A prototype write head included a high permeability NiFe core with electroplated windings of copper wires. For example, a useful write head has a z-dimension (track width) of 1000-2500 microns, a width of 100 microns in the x-direction, and a height in the y-direction of approximately 20 microns. There are four coil turns around each pole piece, for a total of eight. The cross sectional area of the coil was estimated at four microns square, with a three micron spacing. Total length in the x-direction, including core and coils, was 150 microns, and about a ten micron spacing between adjacent magnetic cells.

Referring again to FIG. 1, the display 108 presents a 16-digit personal account number (PAN). The first digit is called a Major Industry Identifier with "1" for Airlines, "3" for Travel and entertainment and "4" or "5" for Banking and financial categories. For example, a card number starting with 4 is a Visa card, a card starting with "51", "52", "53", "54" or "55" is a MasterCard card and a card starting with "34" or "37" is an American Express Card. The first 6 digits including the Major Industry Identifier represent the issuer identifier.

This allows 9-digits and one LRC-checkdigit to be manipulated to identify a user and a virtual account number assignment in the case of a 16-digit PAN. The expiration date can add a bit more information to validate the card, but not as much as four unconstrained digits would. The expiration date, after all, represents a date. Such also must be in the future at card issuance. So the range of the first two digits (M1, M2) is 01-12 for January through December. The last two digits (Y1, Y2) typically can only represent a 5-year range, for 2004 the possible numbers would range only 04-09.

The expiration date can be used to discriminate 1.1% of a user population. For 75-million CitiBank MasterCards, 1.1% is 82,000. Five significant digits in the PAN must be devoted to discriminate amongst 75-million users, because 80,000 would share the same expiration date. Any remaining digits can be used to implement virtual account numbers for one-time transaction use.

So in this example, not counting the LRC-checkdigit there ten digits are available in the PAN, but five digits are needed for user discrimination. Such yields an order of magnitude more security than the 4-digit "PIN level" in common use, and so should be acceptable to most banks.

The security can be improved by adding more orders of magnitude, e.g., by extending the card validity period beyond the typical three years. The bank identifier can be shortened to free up a digit, and the PAN field could be expanded to the full 19-digits allowed by International Standards Organization (ISO) industry-standards. But such would require changes to the MasterCard assignment tables and may be difficult. The extension of the validity period is easily done within the bank.

The assignment of PAN, expiration date, CVC, and other bank personalization process numbers for each new, expired, or renewed account can be optimized to allow accurate distribution of accounts across a full 36-48 month period.

In an alternative embodiment, the CVC can be used for off-line analysis and yield nine digits or orders of magnitude security. But such may not be useful for Card-Not-Present transactions because merchants do not always demand the CVC.

The Card has a display for Card-Not-Present purchases, but such is not necessary for Card-Present purchases. Card-Not-Present refers to internet or phone purchases known as "card not present" transactions. Card-Present refers to merchant machine purchases ("point of sale", or "card acceptance systems"), Automatic Teller Machines or Kiosk systems, etc.

The PAN may have as few as three, or as many as five, bank identifier digits, as mentioned above. The fewer the better, in our examples, though account base variance by an order of magnitude has equal affect.

FIG. 4 illustrates a virtual account number payment card processing system embodiment of the present invention, and is referred to herein by the general reference numeral 400. The system 400 uses a payment card 402 that is very similar to payment card 200 (FIG. 2). That is, payment card 402 is able to change its magnetic card data 404 that is elicited by a card reader 406. Such is also able to display the personal account number which includes the virtual account number. Either can be entered into the system for bank authorization.

The card reader 406 performs various magnetic data operations and checks on the card magnetic data 404. For example, a longitudinal redundancy code (LRC) check that helps assure a valid read of all the data has been made. Once the card reader 406 has determined the card magnetic data 404 is good, an approval request message 408 is sent to a card acquirer 410. Such message includes the user account number, dollar amount of the transaction, and merchant identification (ID).

The validation processing center 410 provides regional high speed network servers that are often operated by third parties and not the issuing banks. The validation processing center 410 checks to see if the user card 402 is not stolen or lost, and other first level account validation. Such may also have cached some information from an issuing bank about this user account if the account has been processed before very recently. One example is an exclusion list.

A card acquirer approval request message 412 is sent to an issuing bank 414. Such also includes the user account number, dollar amount of the transaction, and merchant identification (ID). The user virtual account number is cryptographically checked for validity. The user account checked to see if adequate funds are available. If so, an authorization message 418 is returned. A reconciliation of the user account is made and the merchant's account is credited within a day or two. The card acquirer 410 records the issuing-bank authorization and forwards an approval message 420. The merchant point-of-sale card reader 406 displays the approval and an authorization code, and the transaction is completed. The virtual account number validation processor 416 then adds the number just used to the exclusion list so that such cannot be used again. The payment card 402 also discards this number and readies a new number according to an enciphering scheme.

The payment card 402 should be completely autonomous, and require no feedback or other data return from the rest of the system. This is necessary in order to have the payment card 402 work within the existing legacy payment systems.

Magnetic data is arranged serially in a sequence of thirty-seven numeric data characters, with several more start, end, and data integrity check characters used as field separators. This is the data read by the merchant point of sale terminal. The POS terminal strips away the SS, FS, ES, and LRC characters and forwards the PAN, Additional Data, and Discretionary Data to the merchant acquirer, through the transaction network, and on to the issuing card bank. Table-I illustrates the placement of these data fields on a typical credit card magnetic stripe.

TABLE I

| <37 numeric characters> | | | | | | |
|---|---|---|---|---|---|---|
| SS | PAN | FS | Additional Data | Discretionary Data | ES | LRC |

| | Description |
|---|---|
| SS | one character Start Sentinel, to indicate start of data sequence |
| PAN | 19 character account number field (maximum), includes one digit card type, up to five digits bank identifier, up to 12 digit account number and one check digit (Luhn checksum) |
| FS | one character Field Sentinel to separate data fields |
| Additional Data | seven characters for expiration date, service code, etc. |
| Discretionary Data | eight characters for CVC/CVV/PVV data |
| ES | one character End Sentinel to identify end of data string |
| LRC | one character check digit to confirm magnetic data integrity |

A typical CitiBank MasterCard card is diagrammed in Table II. Each transaction changes the data, and affects the probability of guessing the next number in sequence.

TABLE II

| <37 numeric characters> | | | | | | |
|---|---|---|---|---|---|---|
| SS | 5466160052671983 | FS | 0503149 | 99999999 | ES | 9 |

In this example, the first two digits identify this card as a MasterCard (54), and the whole CitiBank BIN number is identified by the first six digits (546616). The user's account number is 005267198, with a check digit of "3". This number can be fixed to be able to identify the user's account by some number, whether such is the Discretionary Data field, or the PAN field.

The expiration date is preferably fixed and does not change so the transaction network can qualify prior to bank authorization, and prevent unnecessary network loading.

A "service code" number can be changed according to a bank's requirements. This service code can be used to identify the card to the transaction network as a "special" card. The discretionary data field is defined by the bank and consists of 8-9 characters. This field allows for 99,999,999, or 999,999,999, possible combinations of numbers. Such implies one in 100-million, or one in one-billion chance of guessing the next valid number. However, the type of cryptography used will determine the actual statistical odds of guessing the next number.

Referring now to FIG. 5 a CVQ Revised Cryptographic scheme 500, the encryption for each swipe transaction originates on a card 502 and is coded into a dynamic portion 504 of a magnetic stripe 506. When the card is read by a MagStripe reader, both the dynamic and static portions of the stripe are sent through the existing card processing network to the authorization server at the bank. The dynamic portion of the stripe contains a card verification number (CVQ) 508 which has two fields, a two-digit Sequence ID, and a two-digit Cryptogram value. The CVQ is further encoded in a second pass to produce a CVQ-B 510, and that is written to the magnetic stripe and transmitted through the network.

The authorization server uses the fixed portion of the Track-2 data (PAN) to access the account, and the CVQ to authorize/decline the transaction.

Referring now to FIG. 6, a Card CVQ generation method 600, when a swipe transaction occurs, the card generates the next CVQ, or pre-generates and stores such, so such is ready for the next swipe, The SequenceId (SeqId) is indexed into the CryptoTable to retrieve the cryptogram, (SeqId mod CryptoTableLength)=>Index, 0196 mod 843=196=>83. The Pass count is determined for the Crypto Mask table, PassCount=SeqId/CryptoTableLength, 196/843=0 (Pass 0). The cryptogram is converted using Crypto-mask table. The first digit of the cryptogram is substituted with that digit's value in the first digit column of the desired pass, the same is done for the other digit in the cryptogram, according to its respective position in the table.

For example, a cryptogram "83" is substituted into a Pass 0 portion of the table, one digit at a time. The first digit "8" becomes "5" (first digit column, digit=8), the second digit "3" also becomes "5" (second digit column, digit=3), so 83=>55.

Such cryptogram is loaded into the appropriate bit positions in the CVQ. The lower 2-digits of the SequenceId is indexed into the SeqId table to create the obfuscated SeqId value (96=>02). The obfuscated SeqId value is loaded into the appropriate bit positions in the CVQ. The LRC is calculated based on the new CVQ value. The new Q-Chip value is written to the dynamic portion of the MagStripe The SeqId portion of the CVQ repeats every 100-swipes, since that table is 100-entries long. But, the cryptogram sequence will never repeat since that table is 843-entries long, and the crypto mask table will vary the cryptogram patterns after that, assuming each pass has different mask values.

Referring now to FIG. 7, a Card CVQ-B generation method 700, once the CVQ-A has been generated, such can simply be passed once again through the SeqId substitution table to further encode and obfuscate the pattern. The upper two digits of the CVQ-A are indexed into the SeqId substitution table to fetch the lower two digits of the CVQ-B. The lower two digits of the CVQ-A is indexed into the SeqId substitution table to retrieve the upper two digits of the CVQ-B. The LRC is calculated based on the CVQ-B value. The new Q-Chip value is written to the dynamic portion of the MagStripe.

Such cryptographic strategy is very fast, a simple substitution is made through a table already in memory, and will not require additional keys, or storage. Such does not require changes to the HSM or another cryptographic algorithm. The SeqId digits repeating every one hundred transactions are obscured, the cryptogram digits always change vis-á-vis the SeqId digits, because the crypto table is not a multiple of the SeqId table. The CVQ-B digits will not repeat based on SeqId. Attacking the CVQ is made much more difficult for a hacker since repeating patterns do not exist in the CVQ numbers generated.

Figure 8:
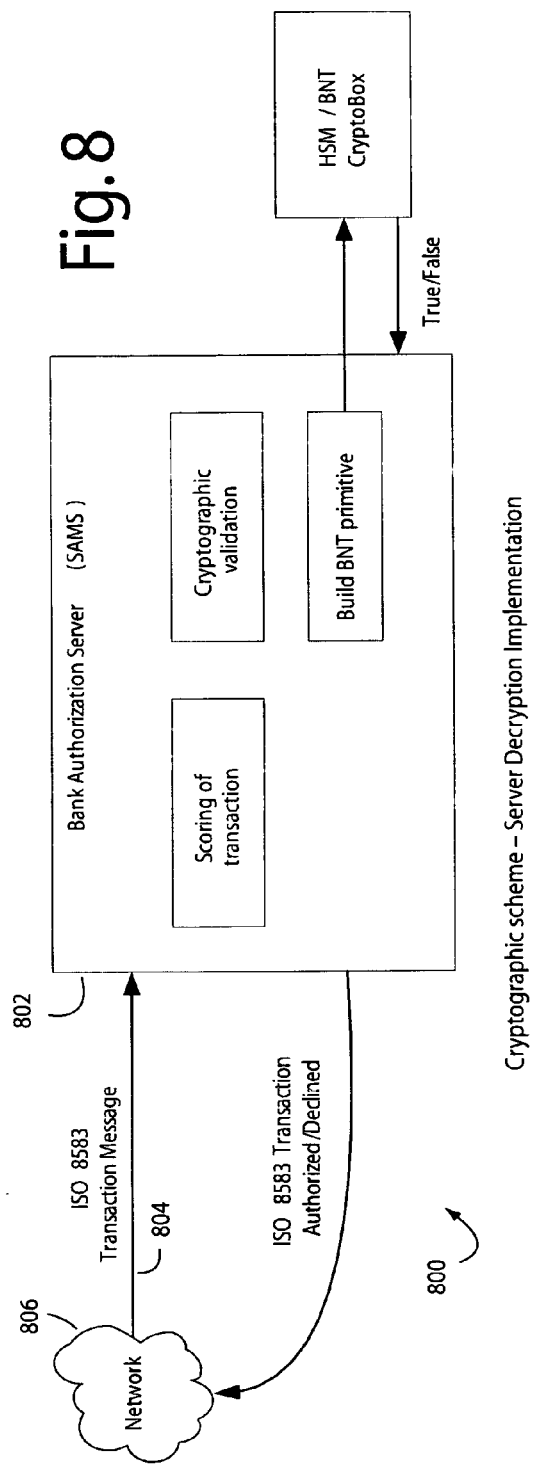
FIG. 8 is a flowchart diagram of a Cryptographic scheme and Server Decryption Implementation embodiment of the present invention.

Referring to FIG. 8, a Cryptographic scheme and Server Decryption Implementation 800, a typical server 802 receives ISO-8583 formatted messages 804 from the network 806. Inside these messages are the network, merchant and card information. The network information determines which server should handle the transaction, e.g., card-present, or card-not-present transactions. The merchant information can be used to help validate a particular transaction. The card information includes the MagStripe data, from which the server 802 can extract the personal account number (PAN). The PAN is used to access the cardholder validation information. At a high-level, the server 802 looks at all of the transaction information and evaluates such against the cardholder context information, e.g., rules, transaction window, etc.

If the transaction is deemed not valid, a message is formatted and the transaction is declined. If the analysis is inconclusive, the card verification number (CVQ) is retrieved from the MagStripe. A CVx type primitive is formatted using the transaction CVQ, recovered SequenceId and this is sent to a cryptographic server for validation. The cryptographic server responds with either True or False and the server then formats a message that either accepts or declines the transaction based on the cryptographic server response.

Figure 9:
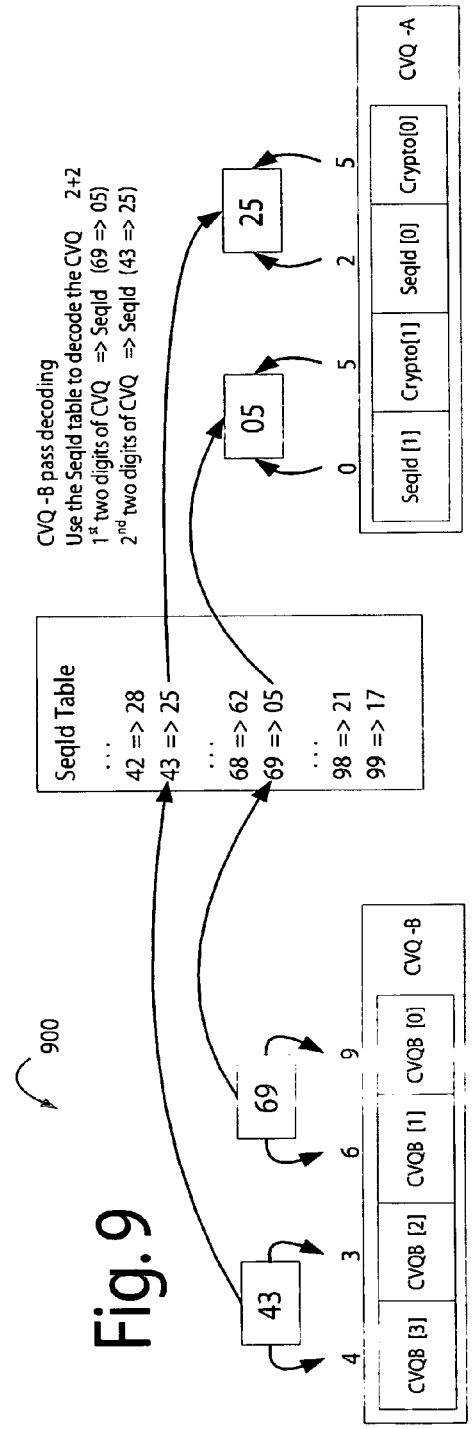
FIG. 9 is a flowchart diagram of a CVQ-A recovery method embodiment of the present invention.

Referring now to FIG. 9, a CVQ-A recovery method 900, the server first converts the CVQ-B digits into the CVQ-A field. The two upper and two lower digits are indexed in turn into the SeqId substitution table to retrieve the CVQ-A.

Figure 10:
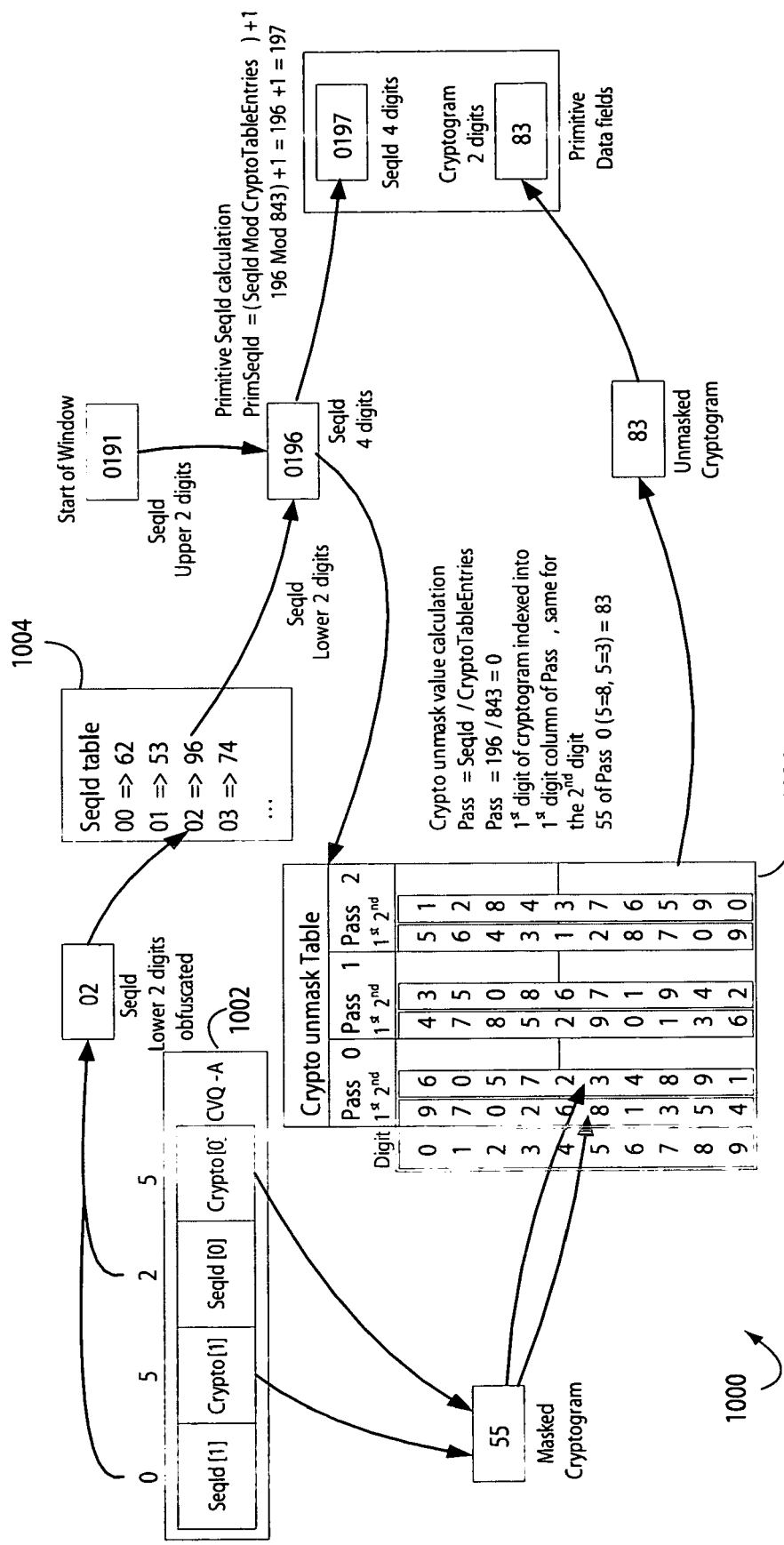
FIG. 10 is a flowchart diagram of a SequenceId/Cryptogram recovery method embodiment of the present invention.

Referring now to FIG. 10, a SequenceId/Cryptogram recovery method 1000, a CVQ-A 1002 is a 4-digit field within the MagStripe data that includes the cryptogram and a portion of the SequenceId. The CVQ field is dynamic and varies from transaction to transaction. Such is used ultimately to validate a particular transaction and based on results of analysis the transaction is either approved or declined. The CVQ-A comprises two sub-fields, the SequenceId (SeqId) and Cryptogram fields, two digits each. The SeqId field is obfuscated by using a SeqId substitution table 1004 to make the Sequence non-obvious. Without this table, the SequenceId would increase with each transaction (ex: . . . 27, 28, 29, 30, 31, . . . ) which would make deducing the purpose of these digits reasonably obvious to anyone seeking to attack the card. Then by process of elimination, the attacker could deduce that the other two digits must represent the cryptogram. Existing bank cryptography (CVX) might be in use for these digits.

A set of Crypto mask/unmask tables 1006 are used on the cryptogram to alter the cryptogram entries on each pass through a cryptographic table on the card. Due to limited space on the card, and also to increase the possible usable life of the card, about 843-cryptographic entries are stored on the card. Once the card exhausts these 843-entries, such starts over, but on the next pass such combines the cryptogram entries with the appropriate pass substitutions in the cryptogram mask table. The first and second digits of the cryptogram are substituted for the values in the crypto mask table on the card and reversed using the crypto unmask table on the server once the cryptogram is received.

The cryptograms for subsequent passes could be deduced, if someone had access to a substantial number of entries, and some knowledge of both the make-up of the CVQ and performed some detailed analysis of the patterns. So, the cryptographic table is not a direct multiple of the SeqId table, crypto table=843 entries, SeqId table=100 entries, to add a little more variation in the SeqId/Cryptographic sequences. The same SeqId does not repeat the next time through the crypto table.

A fraudster having access to this kind of historical data would most likely imply an attack on the processing network (to intercept a substantial transaction history (>~850 transactions, which only a small percentage of cardholders reach today). And, there would still be the safeguard that you couldn't control cardholder behavior. If you succeeded in calculating the next valid cryptogram/SeqId combination from all this past history, you couldn't assure that you could use that transaction successfully before the cardholder used such. So, a collision would occur if not on the first use, at some point in the near term. Also, since each card, or small group of cards, has a unique key, the attack would only yield access to this card or to a small subset of issued cards.

The following Tables III and IV describe methods for recovering the SequenceID and Cryptogram from the CVQ field

TABLE III

The recovery method for getting the SequenceId from the CVQ field comprises:

Recovering the obfuscated SeqId digit from the CVQ (ex above: 5)
Retrieving the SeqId substitution table (this is part of the cardholder information that we can recover by using the MagStripe PAN and accessing the cardholder database).
Indexing the obfuscated SeqId digits into the SeqId substitution table to retrieve the actual SeqId digit (ex: 02 => 96)
Retrieving the Start Index for our Window (this is also part of the cardholder information)
The StartIndex provides the starting position for the Window of allowable transactions. The StartIndex can recover the upper 2 digits of the SeqId.
If the lower digit of Start Index is smaller than the SeqId digit then:
Upper SeqId digits = Upper StartIndex digits
StartIndex = 0191 SeqIdDigits = 96 SeqId = 0196
If the lower digit of StartIndex is larger than the SeqId digit then:
Upper SeqId digits = Upper StartIndex digits + 1
StartIndex = 0197 SeqIdDigits = 96 SeqId = 0296
Several successive out-of-window digits are tried to attempt to synchronize if a first attempt fails (ex: 0196, 0296, 0396).

TABLE IV

To recover the Cryptogram from the CVQ field the following steps are taken:

Recover the Crypto digits from the CVQ (55)
Retrieve the Crypto mask table (this is part of the CardHolder information that we can recover by using the MagStripe PAN and accessing the CardHolder database).
Determine the PassCount for this SeqId
PassCount = SeqId/CryptoTableLength, 196/843 = 0 (Pass 0)
Convert cryptogram using Crypto-unmask table. first digit of cryptogram is substituted with that digit's value in the first digit column of the desired pass; the same is done for the second digit in the cryptogram. In the example above, cryptogram 55 is substituted into the Pass 0 portion of the table one digit at a time, first digit 5 becomes 8 (first digit column, digit = 5) and the second digit 5 becomes 3, so 55 => 83.
The result is our decoded cryptogram.

Transactions are validated by two distinct methods. From the transaction and cardholder data, a cryptographic primitive is initiated to validate the received cryptogram using a dedicated cryptographic unit (HSM/BNT). Besides cryptographic validation, the transaction is evaluated to yield either a true/false result, or a score that can be used to rate the transaction.

If the cryptographic unit returns a valid result and the transaction score or analysis exceeds some pre-determined threshold. The threshold can be very low, or zero, to avoid rejecting any transactions.

Figure 11:
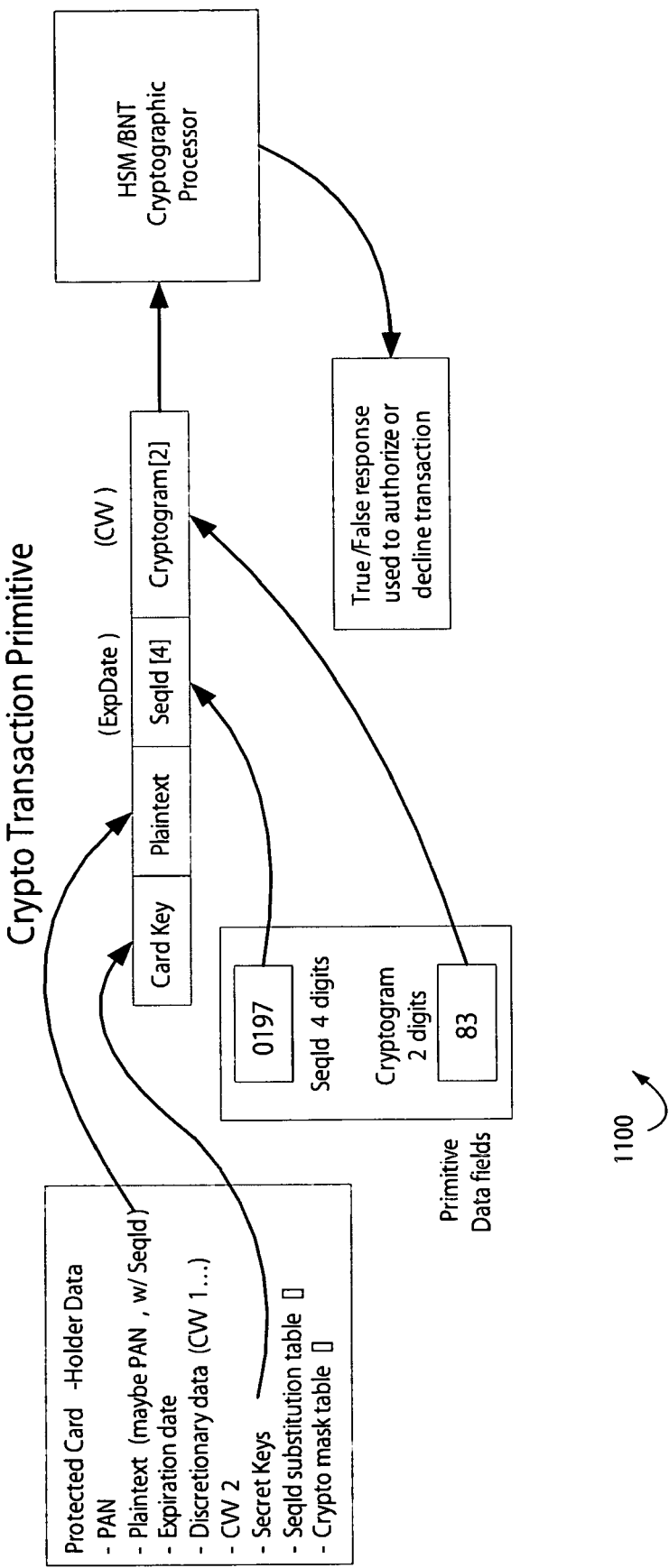
FIG. 11 is a flowchart diagram of a Cryptographic primitive embodiment of the present invention.

Referring now to FIG. 11, a Cryptographic primitive 1100, the cryptographic authentication is performed by an external, dedicated cryptographic server. Communication between the authorization server (SAMS) and the cryptographic server (HSM/BNT) is accomplished via a rigid transaction based protocol. The HSM/BNT offers a number of message primitives to the authorization server. One such primitive is used for CVx authentication (CVV1, CVV2). The message comprises a plaintext field (Padded PAN, etc), an Expiration date field (including AdjustedSeqId ((SeqId modulo 843)+1), and a cryptogram field (including the unmasked cryptogram). The current primitive only allows for a single key and requires a 3-digit cryptogram. This primitive is used as a baseline to derive a new primitive that allows for the Card key to be passed and a 2-digit cryptogram.

The message is built on the authorization server (SAMS) and sent to the cryptographic server (HSM/BNT) for validation. The cryptographic server uses the fields to run the CVx algorithm according to the VISA CVV computation document and returns a TRUE/FALSE result. The authorization server then uses that result to approve or decline the pending transaction.

Figure 12:
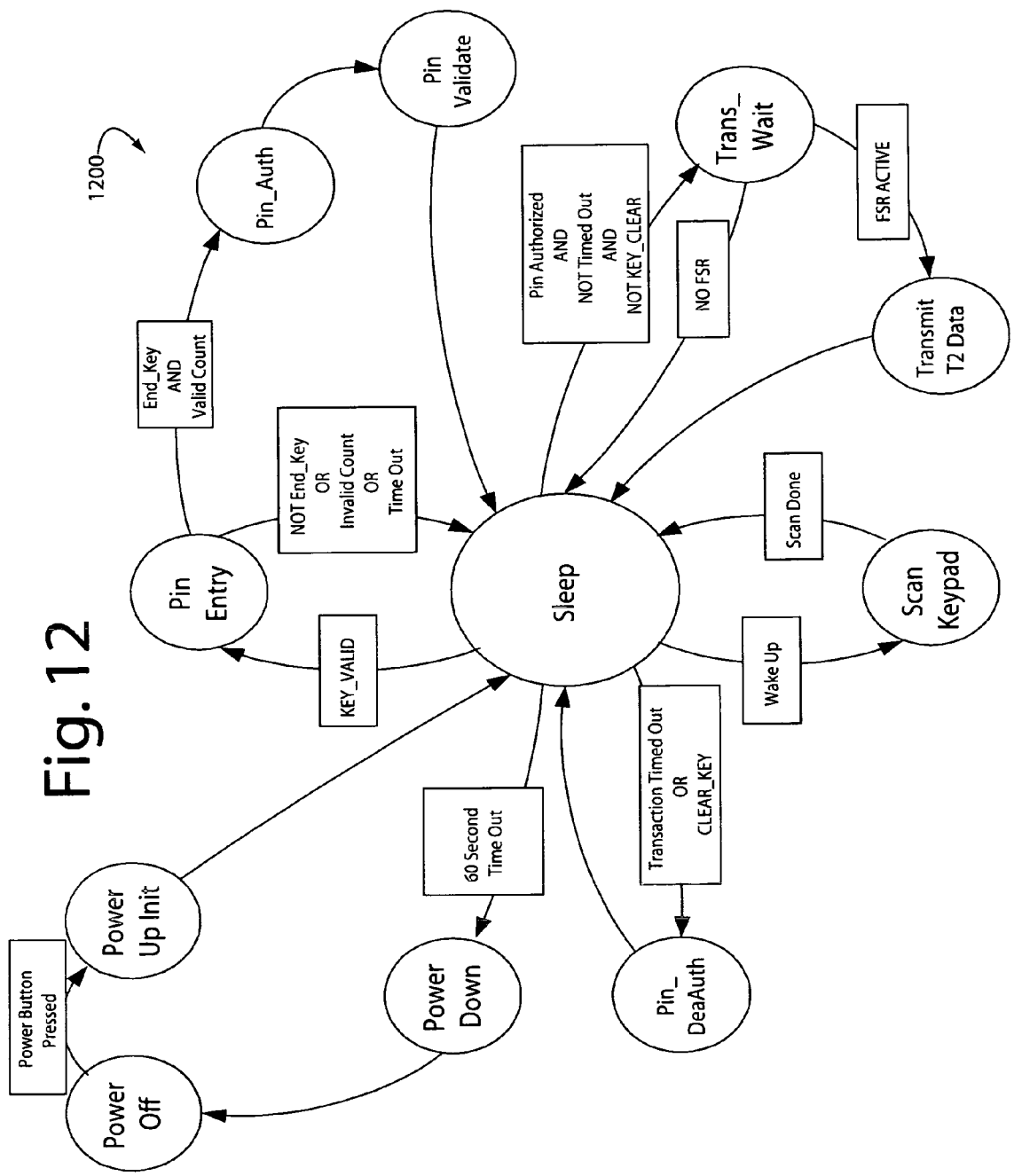
FIG. 12 is a state diagram of personal identification number (PIN) process useful in a payment card illustrated in FIGS. 1-2.

FIG. 12 is a state diagram of personal identification number (PIN) process 1200 useful with payment card 200 illustrated in FIG. 2. The idle state is sleep. A correct PIN entry is required for transaction data transmission (T2 data).

Figure 13:
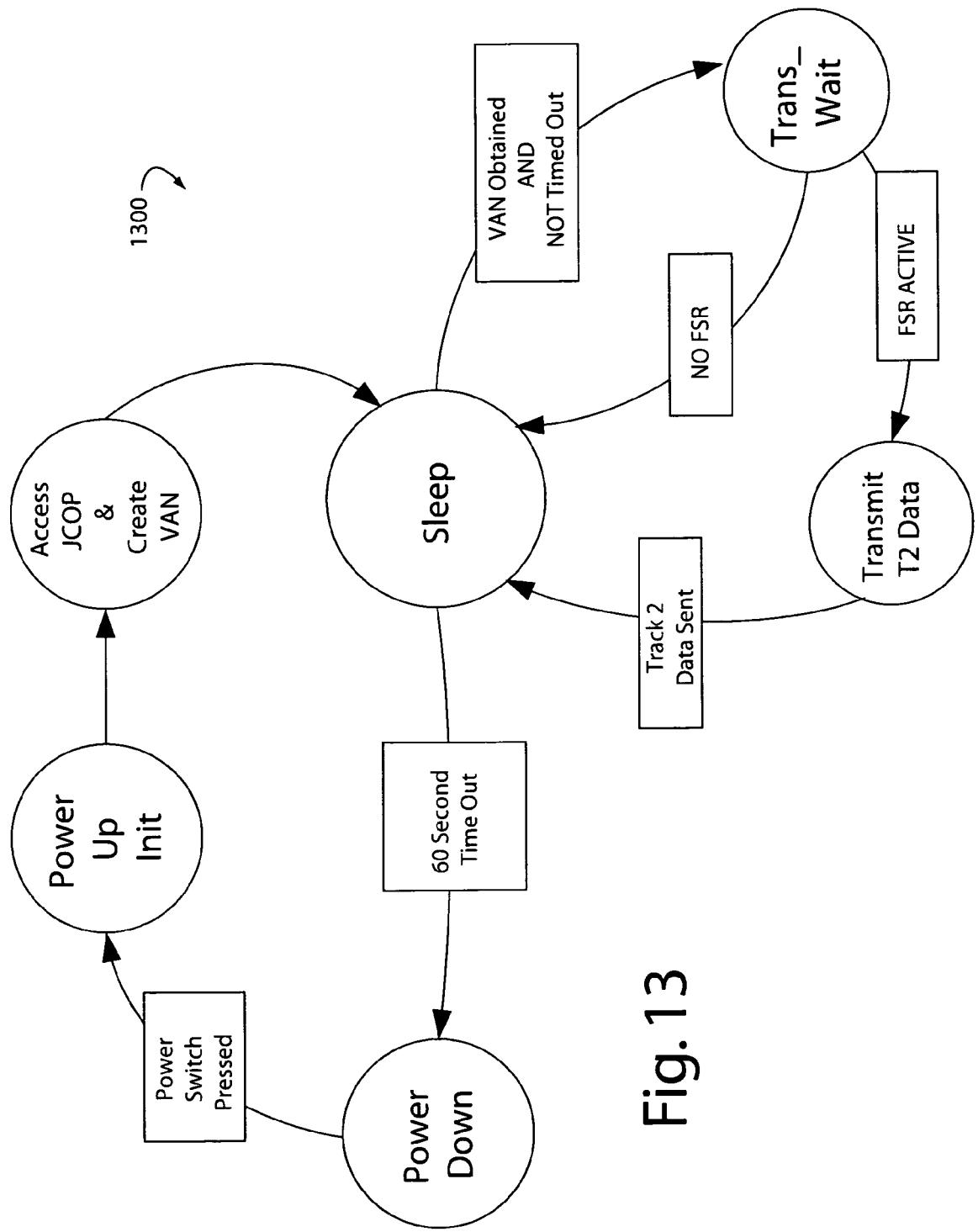
FIG. 13 is a state diagram of virtual account number (VAN) process useful in the payment card illustrated in FIGS. 1-2.

FIG. 13 is a state diagram of virtual account number (VAN) process 1300 useful with payment card 200 illustrated in FIG. 2. The idle state is sleep. A VAN is created at power up. Such VAN can then be transmitted out magnetically and/or visually to complete a transaction.

Figure 14:
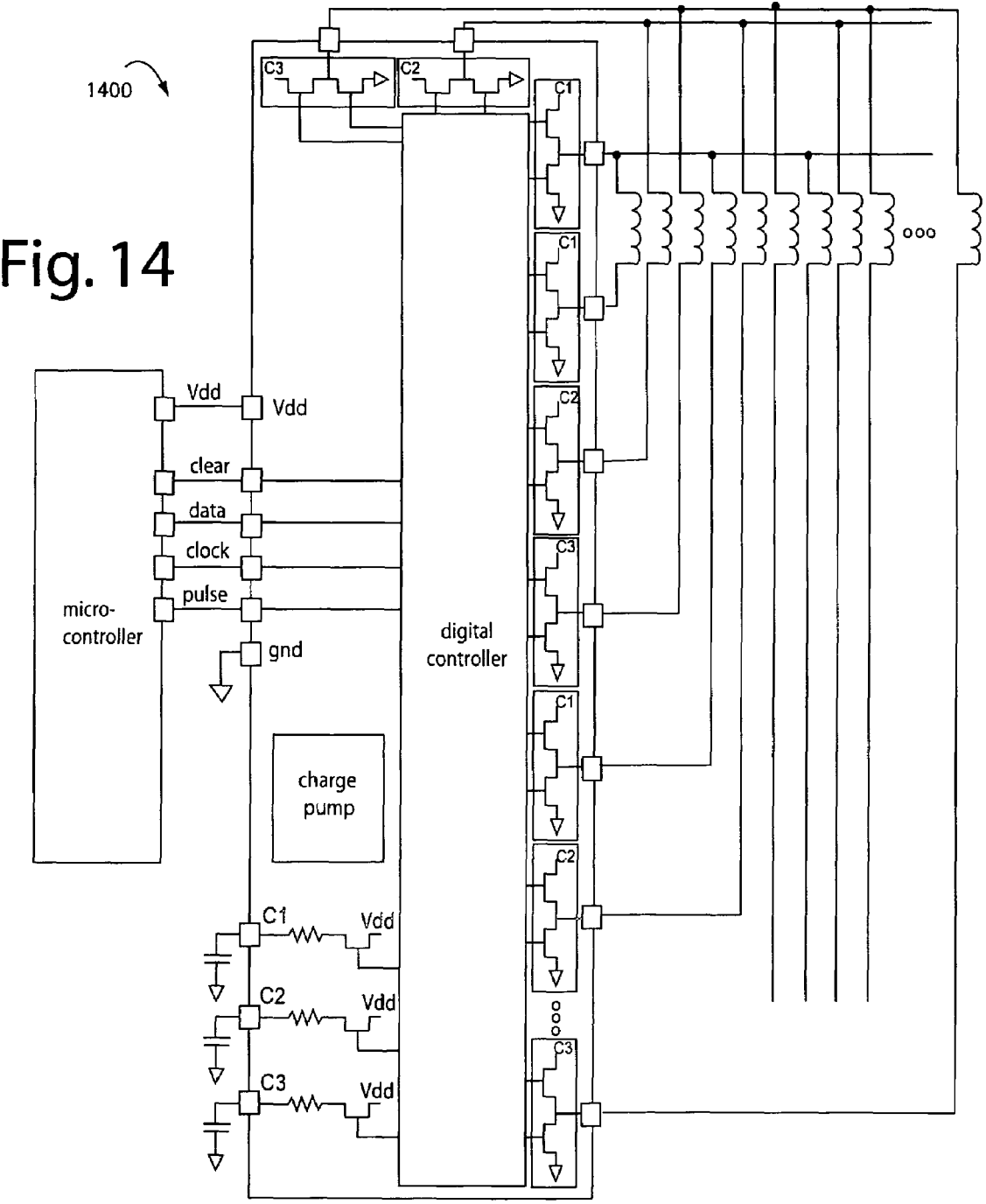
FIG. 14 is a schematic diagram of a magnetic array and controller embodiment of the present invention useful in a payment card illustrated in FIGS. 1-2.

FIG. 14 represents a MEMS magnetic array and controller embodiment of the present invention useful in various payment card embodiments, and is referred to herein by the general reference numeral 1400. In a typical application, as many of seventy parallel magnetic bits need to be programmed and reprogrammed. Each is associated with a write coil. Such is not practical to write all of them in parallel due to battery and current limitations. Each bit must receive an adequate write current for such to program well enough to persist. Programming only one or two bits at a time, in some applications, may not practical because programming only one bit might deprogram its two neighbors. Other embodiments do not suffer from this problem.

Figure 15:
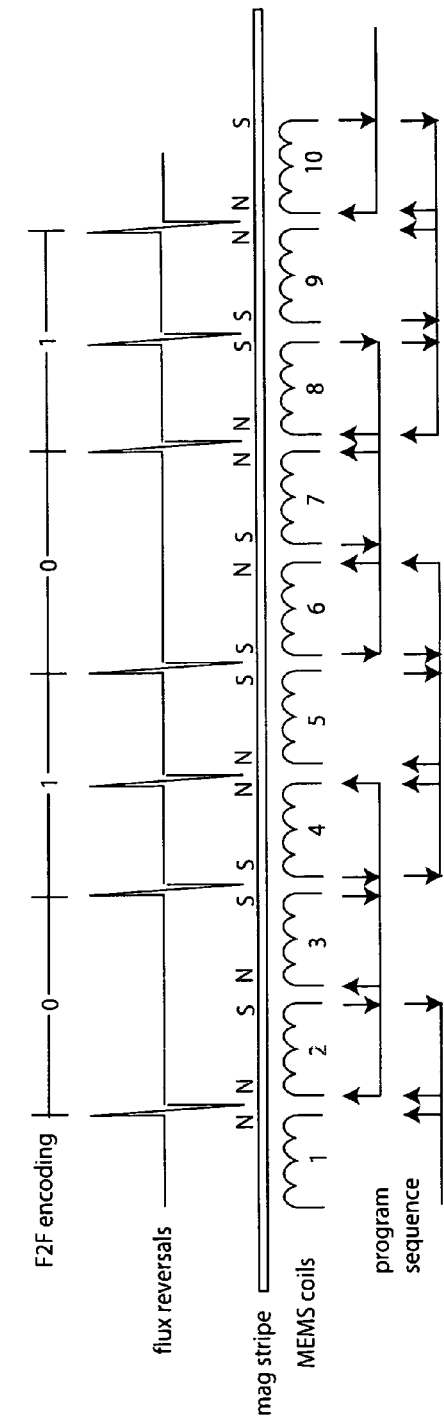
FIGS. 15 and 16 are a schematic diagram and graph showing the relationships between a magnetic stripe, MEMS coils, data encodings, flux reversals, and a programming sequence for a magnetic array.
Figure 16:
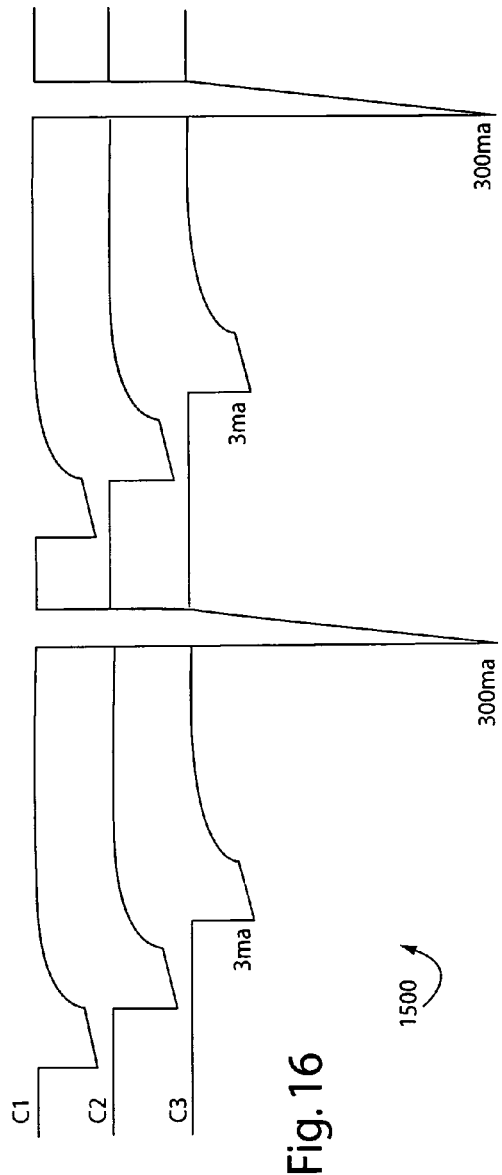

FIGS. 15-16 show the typical relationships between data encodings, flux reversals, a magnetic stripe, individual MEMS coils, and a programming sequence embodiment of the present invention for the magnetic array. Although not a presently preferred embodiment, a three-coil programming method can be used to sequentially update a bit pair at a time until all bits are written. Each lack of a bit reversal is a 0-bit, and each bit reversal is a 1-bit. A set of capacitors are multiplexed to each set of coils in each program cycle. Capacitors are used to build up a sufficient energy charge with a low enough source impedance to produce the required pulse of current needed in each coil. Once programmed, the multiplex target address is incremented by two-bits. With 0.1 microfarad capacitors, and individual milliamp peak charge currents, a cycle could complete in 150-microseconds. With eighty coils for forty bits, two coils per bit, the total program time would be about twelve milliseconds.

In general, "Q-chip" magnetic transducer array embodiments of the present invention are used to create numerous magnetic transitions in a longitudinal magnetic recording medium. The magnetic storage medium is compatible with the read-back signal requirements of standard legacy readers for magnetic stripe credit cards. Legacy readers exploit Faraday's law of electromagnetic induction by having a coil wound on a magnetic core that contains a non-magnetic gap. The recording medium is scanned past the reader gap to produce a read-back signal proportional to the rate of change in magnetic flux with time. The signal is typically 1-3 mV per inch/sec of card speed past the reader head.

In usual practice, magnetic data is written on magnetic stripes by moving the card past a magnetic writing head. Such receives a writing current whose polarity is switched when clocking and data transitions are required. The Q-chip magnetic device requires no motion relative to the recording medium. The writing transducer array and medium are static, small, and thin. They are packaged within a standard credit card and replace a selected portion of the original standard recording medium of that card. The writing array is connected to a battery-powered microprocessor/logical network that drives and sequences each of the numerous writing transducers to produce new encrypted data bit patterns along a magnetic track in the recording medium overlaying the static array.

The writing field is strong enough, given certain magnetic media materials, to erase old data and create new information in a selected region of the recording track. The energy used by the microprocessor, logic network, and writing array enables a useful life, e.g., 1000-2000 write/read cycles, assuming an internal battery of 2-3 volts with about 10-30 mA-hours of charge.

Information in a digital magnetic recording medium is stored as polarity reversals, or transitions, in the direction of the remanent magnetic flux of the recorded medium. The relevant magnetic properties of the storage medium are the coercivity ($H_c$ in Oersteds), remanence ($M_r$ in emu/cm$^3$), magnetic thickness (t in cm), and coercive squareness (S*, a dimensionless number). Low coercivity media can be written with low-level writing currents, but such is easily erased and/or demagnetized. High coercivity media needs very high writing currents to write the bits, but once written the magnetic bits are not easily erased or demagnetized.

Embodiments of the present invention target a coercivity Hc in the range of 50-200 Oersteds (Oe). The lower end of the range is favored in order to conserve battery energy and extend the operational lifetime of the Q-card device. The coercive squareness S* is a measure of the range ($\Delta H$) of recording fields over which the medium switches (S*=1−$\Delta H$/Hc). So such is preferable that $\Delta H$ be small, and S* be close to 1.0. The target is 0.7<S*<1.0.

The read-back signals scale with the remanence-thickness product of the medium, $M_{rt}$ (in emu/cm$^2$). Typical low coercivity media support the ISO/IEC 7811 specification for signal amplitude. These media have $M_{rt}$ in the range of 30-100 milli-emu/cm$^2$ (or memu/cm$^2$). About 80 memu/cm$^2$ should be compatible with the majority of legacy card readers.

Good choices for media in this application include sputtered iron, sputtered cobalt, or alloys of these materials. CoFe is especially suitable in terms of magnetization and controllability. The $H_c$ can be adjusted by varying the alloy composition and fabrication conditions. The $M_s$ can likewise be varied over a wide range by controlling the composition. The magnetic medium should be about 0.1-1.0 µm in thickness.

The magnetic medium can be an alloy of sputtered FeCo (30%-80% Co in Fe), with $M_r$ in the range of 1500-1900 emu/cm$^3$ at a film thickness t of 0.50 micron to 0.67 micron. A variety of recording media exist (oxides of Fe, Ba, or Cr)

with $M_r$ on the order of 100 emu/cm³, so the films would be quite thick (t on the order of 10 microns) to meet signal requirements, and Hc is in the range of 300 Oe up to 2400 Oe. Writing fields for these media would be higher than the suitable range needed for the Q-chip.

Q-chip devices use pulsed electric current flowing in solenoid coils. These are wound around a magnetic core. The pulses will magnetize the core, e.g., North-South or South-North polarity depending on the current direction. The external magnetic field of the core magnetizes the recording medium which retains the polarity of the magnetic field after such is turned off. After each transition is written, a microprocessor addresses a logical network to scan to the next coil in the writing sequence. Such electrical scanning process is repeated until all of the required transitions are written and stored in the recording medium. Through this sequential scanning process with a brief current pulse flowing through an individual coil, the maximum current drain on the battery is limited to very low values, so small batteries can be used. A part of the solenoid coil array is illustrated in FIG. 14. The overlying magnetic medium is removed in the illustration to better show an oblique view of the coil and core details.

The recording medium is a top layer, and may be protected with a protective overcoat of a hard material, such as diamond-like carbon (DLC), or silicon nitride or silicon oxide. The recording medium may be deposited on an under layer of a non-magnetic material, e.g., Cr or Ta, to assist with adhesion and crystallographic orientation.

Credit card data encoding is a double-frequency self-clocking scheme, 2f (FM). There are two magnetic bits for each data bit cell. An all-ones series (11111) is encoded as 1111111111. An all-zeroes pattern (00000) is recorded as 1010101010. With a 40-bit design, there are eighty magnetic coil elements, each of a length L. At recording densities of 75, 150, or 210 bits per inch, for example, L=170, 85, or 60.5 microns and the length of the entire array would be 13.6, 6.8, or 4.8 mm, respectively. At any chosen density, the coil must be designed to generate the required magnetic field at a peak current which is compatible with the battery voltage (typically 2-3 volts.) The coil design requires careful attention to the circuit resistance and inductance. The required magnetic field, and how much current is needed to generate this field dictate both the coil parameters and energy requirements.

The writing field ($H_w$) is set by the coercivity (Hc) of the recording medium. In normal practice $H_w$ is roughly 2 to 3 times Hc. To keep the writing current compatible with a single battery voltage of 2 to 3 volts, a target of 50-100 Oersteds (Oe) is used for $H_c$, so Hw=100 to 300 Oe (8 kA/m to 24 kA/m0. The writing current is roughly estimated with Ampere's Law H=ηNI/L, where η is the writing efficiency (about 0.50), N is the number of coil turns, I is the current (in Amps), and L is the coil length (in meters). For the given range (8-24 kA/m) of medium coercivity, the required current would be I=HL/(ηN)=(1.36-4.08)/N Amps, or 272-816 mA for N=5 turns, a writing efficiency η=0.50, and a coil length L=85 microns (150 bpi). With a battery of 2-Volts, the resistance (R=V/I) of a coil must be in the range of 2.45-7.35 ohms to support the required current.

Figure 17:
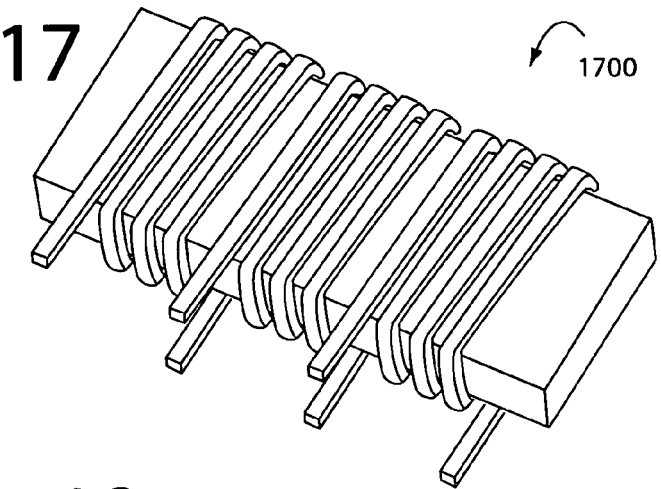
FIG. 17 is a perspective diagram of a three exemplary magnetic MEMS device coils wrapped around a common core which is constructed using nanotechnology.
Figure 18:
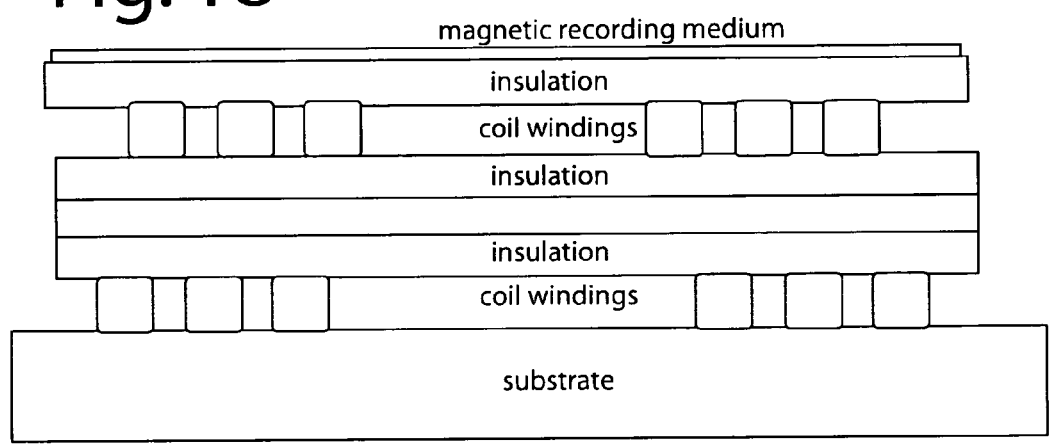
FIG. 18 is a longitudinal cross sectional diagram of an exemplary magnetic MEMS device showing a sandwiched or layered construction in which the Q-Card magnetic stripe is at the top with a layer of insulation separating an outside winding of a coil. The insides of the coils are insulated from a core magnetic film. The whole coil assembly is disposed on the top surface of a plastic substrate.
Figure 19:
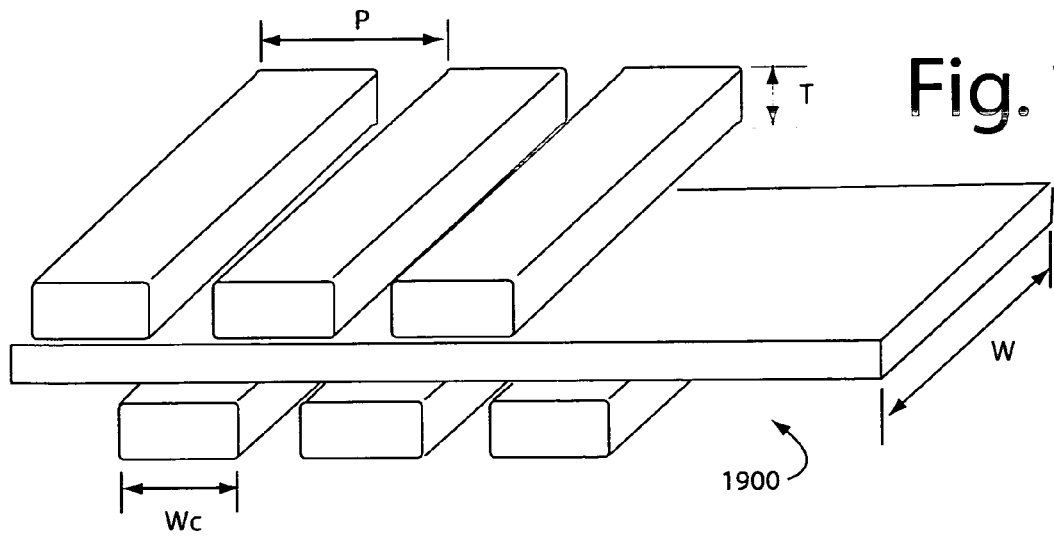
FIG. 19 is a perspective cutaway diagram showing the pitch (P), thickness (T), wire with (Wc), and coil width (W) dimensions of an exemplary magnetic MEMS device coil.

FIGS. 17-19 relate to the MEMS device coil materials, geometry, resistivity, and the number of turns. In FIG. 19, the coil thickness (T), width of a turn (Wc), coil pitch (P), and width of the written track (W) are the geometrical variables in the coil design. Available conducting materials include aluminum (Al), gold (Ag), silver (Au), and copper (Cu). Cu is preferred because such has lower resistivity (ρ=1.724 μΩ-cm) than Al (2.824 μΩ-cm) and Au (2.44 μΩ-cm), and such withstands oxidation better than Ag. Coil resistance R is calculated from the sheet resistance $R_s$=ρ/T (ohms/square) times the number of squares N(2W/Wc), or R=2NWρ/(WcT) ohms. The ISO/IEC 7811 specifications require a reading track width W=1.5 mm. So the conductor width Wc, thickness T, and pitch P must be chosen judiciously to keep resistance down to a useful level. Embodiments of the present invention have Wc=10-15 microns, T=8-12 microns, and P=17 microns, with N=5 for a coil supporting L=85 microns, in a 150-bpi design. For 75-bpi, L=170 microns and N=10 turns. Nominal Cu coil resistances are about 2.6 and 5.2 ohms for N=5 and 10, respectively.

A magnetic core is necessary. Without one, the field above a flat solenoid coil at the location of the recording medium would be too weak. The total field from the upper and lower coil layers is the vector sum of fields from currents flowing in opposite directions. An energized coil magnetizes an unsaturated magnetic core in proportion to the magnetizing field strength along the coil axis. The core magnetization drops off quickly with distance away from the ends of the coil. Variations in the level of core magnetization give rise to magnetic poles within the volume, and on the surface, of the magnetic core. Such is the North and South poles within the core that are the source and sink of the magnetic field outside of the core. Gauss's Law for a magnetic medium applies here, where B=H+4πM and the divergence of M gives rise to the N (+) and S (−) magnetic charge densities in the core. Even though the "free" magnetic charges do not exist in nature, many use Gauss's Law with electrostatics.

A soft magnetic material with high permeability ($\mu=4\pi M_s/H_K$) in the range of 200-10,000 is preferred. There are a number of materials in the NiFe Permalloy series of alloys which are potentially good core candidates. Electroplated $Ni_xFe_{1-x}$ with x close to 80% is a good option because this gives a material with $4\pi M_s$=10,000 Gauss and $H_K$ in the range of 2-10 Oe, so μ is in the range of 1000-5000. Such material has very low coercivity, less than 5 Oe, a modest resistivity, ρ=20 μΩ-cm, and low magnetostriction constant, $\lambda_s$=−10⁻⁷ to −10⁻⁶. When a film is deposited in a magnetic field, pair-ordering anisotropy is induced providing for good control over the formation of magnetic domains when the material is demagnetized. Core saturation is avoided by plating thick films in the range of 4-6 microns. Eddy currents will flow when abrupt changes in magnetizing field are applied, so very thick films should be avoided, e.g., about 10-microns.

A typical MEMS device embodiment of the present invention does not use a closed path structure. Shape anisotropy can affect the device performance. Micro-fabrication processes can be used to pattern the core and achieve the necessary anisotropy by adjusting shape anisotropy.

A 150-bpi design has a core 6-microns thick, 6800-microns long (6.8 mm), and 1500-microns wide (1.5 mm). There are eighty solenoids, each with five wire turns, and L=85-microns. A capacitor is slowly charged over milliseconds to the battery voltage, e.g., 2-volts. The capacitor is switched through a matrix to the terminals of a selected coil. This coil is excited by a current pulse of about 450 mA peak, the magnetic core magnetizes in the vicinity of that coil with an eddy current lag of roughly 50-nanoseconds and reaches a peak writing field of about 200-Oe at the plane of the magnetic recording medium. The current pulse is shaped by the series RLC circuit properties, where R=2.6 ohms, L=125 nH, and C is a capacitor of about 0.10 μF.

The transient response curves for a circuit 2200, in FIG. 22, for selected values of R and L at constant C, are shown in graph 1600, in FIG. 16, as I(t,R,L), in seconds, ohms, and henries. Graph 1600 is −0.2 to 0.6 amps on the Y-axis, and 0-2.5 nanoseconds on the X-axis.

$$K_{damp} = \frac{R^2 C}{4L}, K_{damp} = 0.65, \text{ and } C = 1*10^{-7}.$$

Six combinations are graphed, I(t, 2.6, 250×10⁻⁹), I(t, 3.1, 360×10⁻⁰), I(t, 3.6, 490×10⁻⁹), I(t, 4.1, 640×10⁻⁹), I(t, 4.6, 810×10⁻⁹), and I(t, 5.1, 1000×10⁻⁹). The coil current pulse reaches a peak in about 200-nanoseconds, and decays in about 1.0-1.5 μsec. Eddy current damping in the core reduces the writing field by roughly 10%.

FIG. 22 is a graph 2200 that compares usage timelines 2201-2204 for a conventional bank card, and three scenarios for the Q-card 200. In usage timeline 2201, a conventional bank card is issued and carries the same account number for its entire life. Such card is vulnerable to skimming at any of several transaction events. In usage timeline 2202, a Q-Card 200 outputs unique numbers that are valid till the next transaction, e.g., a valid first number 2206 that is valid until the second transaction where a valid second number 2208 is generated. In usage timeline 2203, another type of Q-Card 200 outputs unique numbers that are valid only during particular time periods, e.g., a valid number 2210 that is valid for a first transaction period, and a valid number 2212 that is valid for a second transaction period. In usage timeline 2204, a combinational type of Q-Card 200 outputs unique numbers that are valid only during particular time periods that linger until a next transaction, e.g., a valid number 2214 that is valid during and after a first transaction period, and a valid number 2216 that is valid during and after a second transaction period. The useful service life of all the Q-Cards 200 is ended when the last unique number has been used or the expiration date has been reached.

An alternative embodiment of the present invention does not associate a transaction number to a particular period but instead vary the index used to get a transaction number and increase this index automatically after a certain period of time even if the transaction number has not been used so this transaction number position is NOT usable anymore. This will expire some transaction numbers after a certain period of times even if they haven't been used.

A map 2300 and timeline 2302 in FIG. 23 represent how a variation of the scenarios in FIG. 17 would play out. For example, on a Monday a customer with a Q-Card 200 buys something in Redwood City, Calif. All is normal. On Tuesday, that customer buys something else at another store in East Palo Alto, Calif. The Q-Card 200 generated a next valid number for this transaction. Here a fraudster skims the card and gets a duplicate of that transaction number. Later on Thursday, the fraudster attempts to use the skimmed card in Palo Alto, but is prevented because that unique transaction number has already expired because of previous use or time period. The payment server is in a position to tell immediately where and when the skimming occurred, and where the fraudster is attempting to use the skimmed card now. Law enforcement authorities can be notified. The customer, however, can be left completely out of this loop and not adversely affected. For example, the customer can use the Q-Card 200 in Mountain View, because a new valid unique number was generated for the transaction.

Attempts to re-direct an old Q-Card 200 to act as a support in skimming will result in detectable fraud because the internal magnetic MEMS device will write over anything programmed overhead in the magnetic stripe the next time such is used. If not, the low-coercitivity material will eventually relax and the skimmed data in the MEMS device area will deprogram.

So, a business model embodiment of the present invention provides for reducing credit card fraud, and includes cryptographically generating a series of unique values from user account access numbers and storing them as sets in corresponding private crypto-tables in a plurality of credit cards. The plurality of credit cards are deployed in the retail community such that each can modify its own magnetic stripe with values obtained from the private crypto-tables to result in a complete magnetically recorded transaction number that can only be authorized by a payment server once. A fraud detection program is installed on the payment server that can compute from the user account access numbers a next set of unique values that would have been validly stored in each of the crypto-tables. A business can be made of selling to subscribers a report service connected to the fraud detection program that is able to detect and announce the merchant location of a skimming event and attempt at fraud.

Although particular embodiments of the present invention have been described and illustrated, such is not intended to limit the invention. Modifications and changes will no doubt become apparent to those skilled in the art, and such is intended that the invention only be limited by the scope of the appended claims.

The invention claimed is:

1. A method for preventing payment card fraud, the method comprising:
    loading individual table values with a sequence of next valid values to crypto-tables within payment cards during manufacturing and before distribution to users;
    issuing to users a payment card that thereafter internally fetches next valid values in a sequence from said crypto-table a dynamic portion of a new account number on as part of the data readable on a magnetic stripe automatically and without user intervention each time such is used in a merchant transaction;
    connecting a merchant card reader or ATM to read said magnetic stripe on said payment card, and to report said new account number when a user initiates a merchant transaction;
    analyzing a report from said merchant card reader to determine if said new account number includes an expected next valid value in said crypto-table that was loaded in that particular payment card during manufacturing and before distribution its user;
    logging a merchant identification data associated with each said report from said merchant card reader into a database; and
    deciding whether to authorize said merchant transaction based on previous data logged into said database related to previous merchant transactions for said particular payment card.

2. The method of claim 1, further comprising:
    mining said database for evidence of fraudulent a ment card use that includes an attempt to initiate a subsequent merchant transaction with an account number that was already accepted for use in a previous merchant transaction; and
    reporting corresponding merchant identification data from said database for law enforcement efforts which identify said payment card and locations of said merchant card reader.

3. The method of claim 1, further comprising:
    mining said database for evidence of fraudulent payment card use that includes an attempt to initiate a subsequent merchant transaction with an account number that was already accepted for use in a previous merchant transaction; and not allowing said payment card be to initiate any further merchant transactions.

4. The method of claim 1, further comprising:

mining said database for evidence of fraudulent payment card use that includes an attempt to initiate a subsequent merchant transaction with an account number that was already accepted for use in a previous merchant transaction; and disabling said payment card from being able to initiate any further merchant transactions or partially disabling payment card for new merchants only.

5. A method for preventing payment card fraud, the method comprising:

issuing to users a payment card able to internally generate a new account number on a magnetic stripe each time such is to be used;

connecting a merchant card reader or ATM to read said magnetic stripe on said payment card, and to report said new account number when a user initiates a merchant transaction;

analyzing a report from said merchant card reader to determine if said new account number is valid or an attempt at fraud as evidenced by a second attempt to use the same account number in a different subsequent transaction;

logging into a database a merchant identification data associated with each said report from said merchant card reader;

deciding whether to authorize said merchant transaction based on a validity criteria associated with said new account number;

activating a timer on each said payment card after a card transaction, and causing a next transaction number to be skipped resetting a new count when such timer times-out; and preventing copies of magstripe data from being accepted in a decision making process to authorize the transactions after a fixed period of time.

6. A payment card system, comprising:

a payment card with a magnetic stripe with a data track and means to communicate data track information to a payment processing server through a magnetic device to a merchant or ATM magnetic card reader;

a sequence of next valid values permanently disposed in crypto-tables within said payment cards;

a microcontroller included in said payment card to internally fetch a sequence of next valid values said crypto-table to include as a dynamic portion of a new account number for automatic presentation on said magnetic stripe and without user intervention each time the payment card is used in a merchant transaction;

a payment processing server configured to analyze a report from said merchant card reader to determine if said new account number includes an expected next valid value in said crypto-table that was loaded in that particular payment card during manufacturing and before distribution its user;

a database of merchant identification data associated with each said report from said magnetic card reader; and a program for deciding whether to authorize said merchant transaction based on a validity criteria associated with said new account number;

wherein, the user is not provided an input to make choices or selections into their payment card, and the payment card itself does not employ a card number generator algorithm to calculate said new account number.

7. The payment card system of claim 6, further comprising:

a merchant card reader for reading said magnetic stripe on said payment card, and for reporting said new account number when a user initiates a merchant transaction.

8. The payment card system of claim 6, further comprising:

a device for mining said database for evidence of fraudulent payment card use that includes an attempt to initiate a subsequent merchant transaction with an account number that was already accepted for use in a previous merchant transaction; and a report data to enable law enforcement efforts in real-time which identify said payment card and locations of said merchant card reader.

9. The payment card system of claim 6, further comprising:

means for mining said database for evidence of fraudulent payment card use that includes an attempt to initiate a subsequent merchant transaction with an account number that was already accepted for use in a previous merchant transaction; and means for disabling said payment card from being able to initiate any further merchant transactions.

10. The payment card system of claim 6, further comprising:

a device for mining said database for evidence of fraudulent payment card use that includes an attempt to initiate a subsequent merchant transaction with an account number that was already accepted for use in a previous merchant transaction; and a report data providing for law enforcement efforts in real-time or batch that identify said payment card and locations of said merchant card reader, and that identify when and where a fraudulent transaction was originated.

11. A business model for reducing credit card fraud, comprising:

before distributing a plurality of payment cards, and during their manufacture, cryptographically generating a series of unique values from user account access numbers and storing them as sets in corresponding private crypto-tables disposed in each of said plurality of credit cards;

deploying said plurality of credit cards in the retail community that each can modify its own magnetic stripe with values obtained from said private crypto-tables to result in a complete magnetically recorded transaction number that can only be authorized by a payment server once;

using a fraud detection program on said payment server that can compute from said user account access numbers a next set of unique values that would have been validly stored in each of said crypto-tables; and connecting a report service to the fraud detection program to detect and announce the merchant location of a skimming event and attempt at fraud.

\* \* \* \* \*